United States Patent
Matsuo

(10) Patent No.: US 9,331,984 B2
(45) Date of Patent: May 3, 2016

(54) SECRET SHARING METHOD AND SYSTEM

(71) Applicant: PANASONIC CORPORATION, Osaka (JP)

(72) Inventor: Masakatsu Matsuo, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 122 days.

(21) Appl. No.: 13/973,232

(22) Filed: Aug. 22, 2013

(65) Prior Publication Data
US 2014/0173270 A1 Jun. 19, 2014

(30) Foreign Application Priority Data

Aug. 24, 2012 (JP) ................................. 2012-185728

(51) Int. Cl.
*H04L 29/06* (2006.01)
*H04L 9/08* (2006.01)

(52) U.S. Cl.
CPC ............ *H04L 63/0428* (2013.01); *H04L 9/085* (2013.01); *H04L 9/0869* (2013.01)

(58) Field of Classification Search
USPC .......................................................... 380/28
See application file for complete search history.

(56) References Cited

U.S. PATENT DOCUMENTS

| | | | |
|---|---|---|---|
| 7,945,784 B1 * | 5/2011 | Masinter et al. ............... | 713/180 |
| 8,245,040 B2 | 8/2012 | Matsuo | |
| 8,261,088 B2 | 9/2012 | Matsuo | |
| 8,307,208 B2 | 11/2012 | Matsuo | |
| 2004/0047472 A1 * | 3/2004 | Eskicioglu ..................... | 380/277 |
| 2004/0179686 A1 * | 9/2004 | Matsumura et al. ............ | 380/44 |
| 2007/0160197 A1 * | 7/2007 | Kagaya et al. ................. | 380/28 |
| 2008/0082817 A1 * | 4/2008 | Takahashi et al. ............. | 713/155 |
| 2008/0205637 A1 * | 8/2008 | Kurihara et al. ............... | 380/28 |
| 2008/0232580 A1 | 9/2008 | Hosaka et al. | |
| 2009/0276622 A1 | 11/2009 | Matsuo | |
| 2009/0285389 A1 | 11/2009 | Matsuo | |
| 2010/0046740 A1 * | 2/2010 | Schneider ...................... | 380/28 |
| 2010/0260334 A1 * | 10/2010 | Obana ............................ | 380/28 |

FOREIGN PATENT DOCUMENTS

JP 2007-124032 5/2007

OTHER PUBLICATIONS

Lin, "A (T, N) Threshold Secret Sharing System with Efficient Identification of Cheaters", Computing and Informatics, vol. 24, 2005, pp. 529-541.*
Adi Shamir, "How to Share a Secret", Communications of the ACM, vol. 22, No. 11, Nov. 1979, pp. 612-613.
Extended European Search Report, dated Feb. 15, 2016, from the European Patent Office (EPO) in the corresponding European Patent Application No. 13181324.8.

* cited by examiner

*Primary Examiner* — Izunna Okeke
*Assistant Examiner* — Hee Song
(74) *Attorney, Agent, or Firm* — Greenblum & Bernstein, P.L.C.

(57) ABSTRACT

In a secret sharing process based on an improved threshold scheme, secret data is shared as shared data parts equal to or greater than a threshold value in number such that the secret data cannot be reconstructed from shared data parts less than the threshold value in number. Each of the shared data pieces is created essentially from a different combination of the secret data pieces and the data pieces for secret sharing computation. The secret sharing process allows an algorithm desired by the user to be freely incorporated, and can prevent the secret data to be easily reconstructed even when more shared data parts than the threshold value are acquired by a third party.

20 Claims, 28 Drawing Sheets

Fig.6

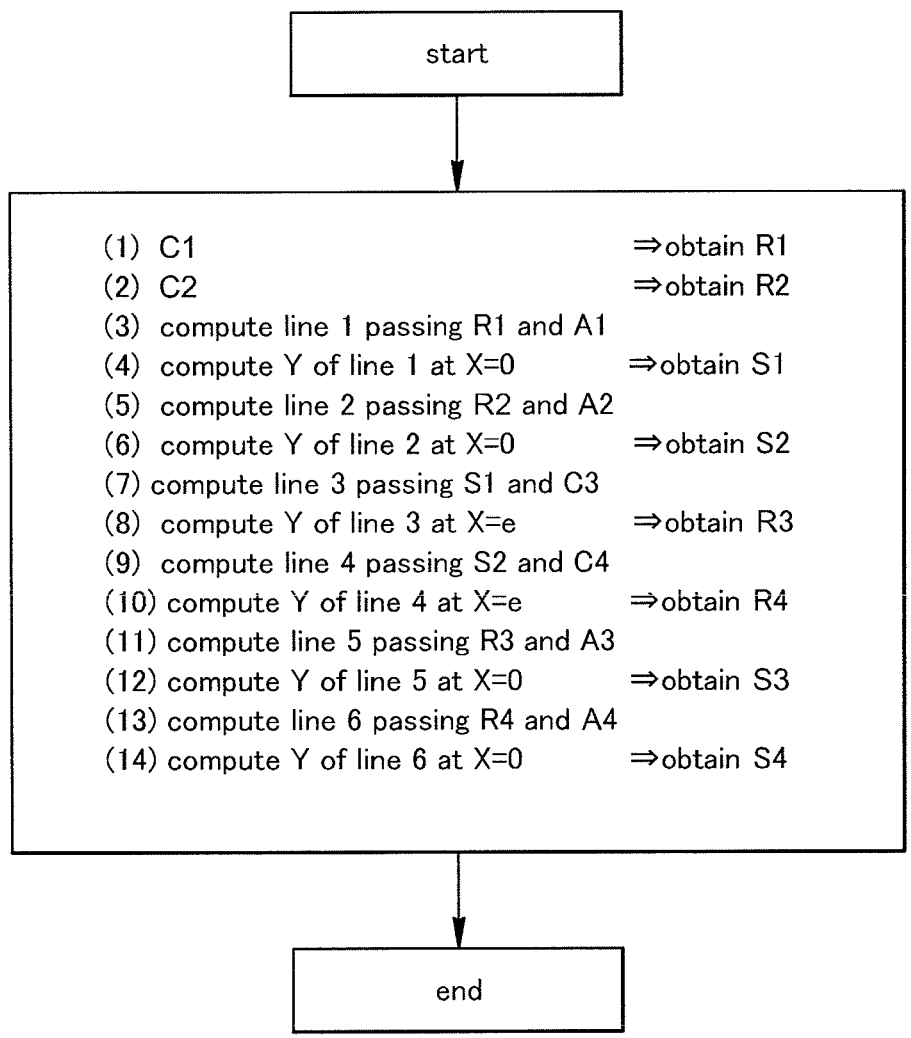

(1) C1 ⇒ obtain R1
(2) C2 ⇒ obtain R2
(3) compute line 1 passing R1 and A1
(4) compute Y of line 1 at X=0 ⇒ obtain S1
(5) compute line 2 passing R2 and A2
(6) compute Y of line 2 at X=0 ⇒ obtain S2
(7) compute line 3 passing S1 and C3
(8) compute Y of line 3 at X=e ⇒ obtain R3
(9) compute line 4 passing S2 and C4
(10) compute Y of line 4 at X=e ⇒ obtain R4
(11) compute line 5 passing R3 and A3
(12) compute Y of line 5 at X=0 ⇒ obtain S3
(13) compute line 6 passing R4 and A4
(14) compute Y of line 6 at X=0 ⇒ obtain S4

| 1st random number data | R1 | R2 | R3 | R4 | R5 | R6 | R7 |
|---|---|---|---|---|---|---|---|
| secret data | | | | S1 | S2 | S3 | S4 |
| 2nd random number data | | | | r1 | r2 | r3 | r4 |
| | ↓ | ↓ | ↓ | ↓ | ↓ | ↓ | ↓ |
| shared data part A | A1 | A2 | A3 | A4 | A5 | A6 | A7 |

(B)

| 1st random number data | | R1 | R2 | R3 | R4 | R5 | R6 |
|---|---|---|---|---|---|---|---|
| secret data | | | | S1 | S2 | S3 | S4 |
| 2nd random number data | | | r1 | r2 | r3 | r4 | r5 |
| | | ↓ | ↓ | ↓ | ↓ | ↓ | ↓ |
| shared data part B | | B2 | B3 | B4 | B5 | B6 | B7 |

(C)

| 1st random number data | | | R1 | R2 | R3 | R4 | R5 |
|---|---|---|---|---|---|---|---|
| secret data | | | | S1 | S2 | S3 | S4 |
| 2nd random number data | | r1 | r2 | r3 | r4 | r5 | r6 |
| | | ↓ | ↓ | ↓ | ↓ | ↓ | ↓ |
| shared data part C | | C2 | C3 | C4 | C5 | C6 | C7 |

(D)

| 1st random number data | | | | R1 | R2 | R3 | R4 |
|---|---|---|---|---|---|---|---|
| secret data | | | | S1 | S2 | S3 | S4 |
| 2nd random number data | r1 | r2 | r3 | r4 | r5 | r6 | r7 |
| | ↓ | ↓ | ↓ | ↓ | ↓ | ↓ | ↓ |
| shared data part D | D1 | D2 | D3 | D4 | D5 | D6 | D7 |

*Fig.20*

(A)
```
A1 = FunctionA(R1, S1)
A2 = FunctionA(R2, S2)
A3 = FunctionA(R3, S3)
A4 = FunctionA(R4, S4)
```

(B)
```
B1 = FunctionB(R1)
B2 = FunctionB(R2, S1)
B3 = FunctionB(R3, S2)
B4 = FunctionB(R4, S3)
B5 = FunctionB(R5, S4)
```

(C)
```
C1 = FunctionC(R1)
C2 = FunctionC(R2)
C3 = FunctionC(R3, S1)
C4 = FunctionC(R4, S2)
C5 = FunctionC(R5, S3)
```

*Fig.25*

|  | 1 | 2 | ... | FFH |
|---|---|---|---|---|
| 1 | FE03H | 103AH | ... | 029BH |
| 2 | 2A75H | 82DCH | ... | 681BH |
| ... | ... | ... | ... | ... |
| FFH | 1FA3H | 1965H | ... | 0531H |

Fig.26

|  | S1 | R1 |
|---|---|---|
| ... | ... | ... |
| 029BH | FFH | 1 |
| ... | ... | ... |
| 0531H | FFH | FFH |
| ... | ... | ... |
| FE03H | 1 | 1 |
| ... | ... | ... |

SECRET SHARING METHOD AND SYSTEM

TECHNICAL FIELD

The present invention relates to a secret sharing method and a secret sharing system in which secret data (original data) is split into a plurality of data parts equal to or greater than a threshold value in number in such a manner that the secret data cannot be reconstructed with a number of data parts smaller than the threshold value in number.

BACKGROUND ART

The recent rapid development in the information processing technology using computers has increased the importance of storing and managing critical electronic information such as corporate confidential information and personal information in a secure manner. In particular in the environment of crowd computing where users receive various services from a server via a network, there is a risk that the critical information on the network could be compromised, and various technologies have therefore been developed with the aim of removing such security risks.

The secret sharing method (threshold scheme) is known as such a technology. Secret data containing critical information is split into n shared data parts such that the secret data can be reconstructed when k or more of the n data parts are available. In particular, the method using polynomial interpolation is well known (see Non-Patent Document 1). According to this threshold scheme, as opposed to the encryption technology such as RSA (Rivest, Shamir and Adelman) encryption relying on the computational load for security, even when less than k shared data parts are acquired by a third party, the security of the secret data can be ensured without regard to the computational power of the information processing device (decryption device) which may be at the disposal of the third party from the viewpoint of the information theory.

On the other hand, as the threshold scheme requires a significant computational load (processing time) for the polynomial computations, this scheme may not be suitable for applications where a real time response is required or a large amount of data is required to be processed. As a technology that overcomes this problem, it is known to use XOR (exclusive logical sum) instead of polynomial interpolation. See Patent Document 1.

PRIOR ART DOCUMENT(S)

Non-Patent Document(S)

Non-Patent Document 1: A. Shamir: "How to Share a Secret", Communications of the ACM, November 1979, Volume 22, Number 11.

Patent Document(S)

Patent Document 1: W9007-124032

SUMMARY OF THE INVENTION

Task to be Accomplished by the Invention

However, according to the prior art disclosed in Patent Document 1, because the use of XOR is a prerequisite, it is not possible to incorporate other algorithms that the use may desire to use so that the lack of flexibility reduces the convenience of the method. According to the prior art based on the threshold scheme, owing to the nature of the scheme, if more shared data parts than the threshold value are acquired by a third party, the third party is able to reconstruct the secret data without any difficulty because the algorithm is fixed, and is likely to be known to the third party.

The present invention was made in view of such problems of the prior art, and has a primary object to provide a secret sharing method and a secret sharing system based on an improved threshold scheme that allow an algorithm desired by the user can be freely incorporated, and can prevent the secret data to be easily reconstructed even when more shared data parts than the threshold value are acquired by a third party.

A second object of the present invention is to provide a secret sharing method and a secret sharing system based on an improved threshold scheme that can reduce the computational load that is required to share the secret data and reconstruct the secret data if so desired.

Means to Accomplish the Task

The present invention eliminates such problems of the prior art by providing a secret sharing method in which secret data is shared as shared data parts equal to or greater than a threshold value in number such that the secret data cannot be reconstructed from shared data parts less than the threshold value in number, comprising the steps of: generating a plurality of groups of data pieces for secret sharing computation including data nieces derived from the secret data, the groups being equal to or greater than the threshold value in number; creating a plurality of shared data pieces from data pieces for secret sharing computation belonging to different groups of data pieces; and combining the created shared data pieces into a plurality of shared data parts equal to or greater than the threshold value in number; wherein shared data pieces are created from different combinations of data pieces for secret sharing computation.

Such objects can be accomplished also by providing a secret sharing system including a secret sharing processing unit for splitting secret data into a plurality of shared data parts equal to a greater than a threshold value in number, a communication control unit for transmitting the shared data parts and a reconstruction processing unit for reconstructing the secret data from the shared data parts equal to or greater than the threshold value in number received from the communication control unit, wherein: the secret sharing processing unit is configured to create a plurality of shared data parts each given as a combination of a plurality of shared data pieces, each shared data piece being created from a plurality of data pieces for secret sharing computation including a secret data piece generated from the secret data; and the reconstruction processing unit is configured to reconstruct the secret data from the received shared data parts upon receiving the shared data parts equal to greater than the threshold value in number; each of the shared data pieces being created from an essentially different combination of the data pieces for secret sharing computation.

Thus, according to the present invention, in a secret sharing process based on an improved threshold scheme, secret data is shared as shared data parts equal to or greater than a threshold value in number such that the secret data cannot be reconstructed from shared data parts less than the threshold value in number. According to a preferred embodiment of the present invention, each of the shared data pieces is created essentially from a different combination of the secret data pieces and the data pieces for secret sharing computation. The secret sharing process allows an algorithm desired by the user to be freely incorporated, and can prevent the secret data to be easily reconstructed even when more shared data parts than the threshold value are acquired by a third party.

Effect of the Invention

According to the invention, by using an improved threshold scheme, a secret sharing can be achieved by using essentially any mathematical functions selected by the user. Therefore, mathematical functions suitable for each application in terms of the level of security and the required computational load can be selected. And, because the selected mathematical functions may not be fixed, and are therefore difficult for a third party to know, even when shared data parts equal to a greater than the threshold value in number may be made available to the third party, the third party may still be prevented from easily reconstructing the secret data.

BRIEF DESCRIPTION OF THE DRAWINGS

Now the present invention is described in the following with reference to the appended drawings, in which:

FIG. 6 is a flowchart showing the process of reconstructing the secret data from two of the shared data parts A and C shown in FIG. 3;

FIG. 12 is a diagram illustrating the process of creating shared data pieces of each shared data part according to the secret sharing method of a second embodiment, (A), (B), (C) and (D) showing how shared data part A, shared data part B, shared data part C and shared data part D are created, respectively;

FIG. 20 is a diagram listing the shared data creating mathematical functions that are used for the secret sharing process of a third embodiment of the present invention;

FIG. 25 shows a reference table for creating shared data parts in a modification of the third embodiment;

FIG. 26 shows a reference table for reconstructing secret data in the modification of the third embodiment;

DETAILED DESCRIPTION OF THE PREFERRED EMBODIMENT(S)

First Embodiment

Figure 1:
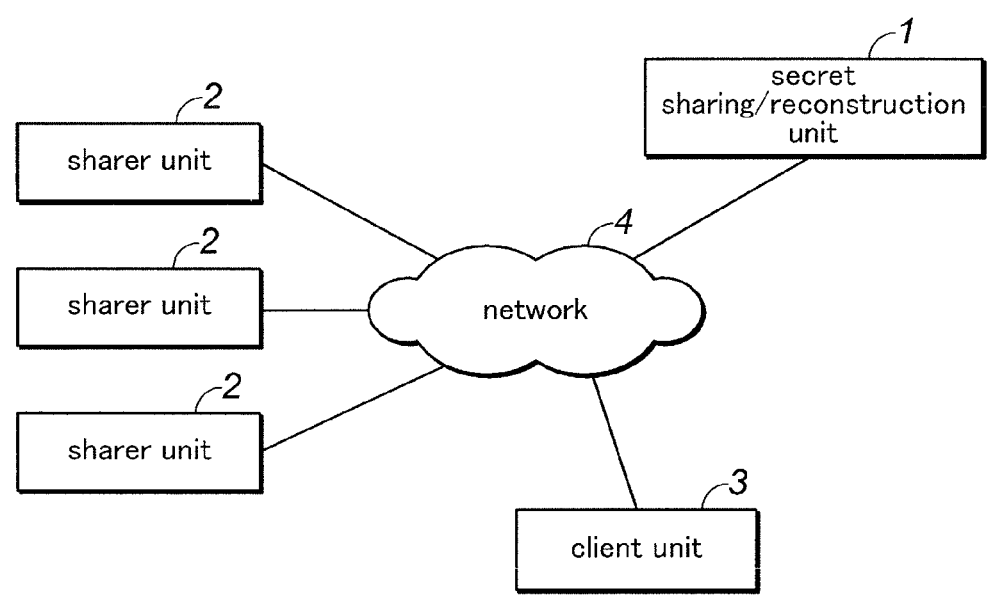
FIG. 1 is a block diagram of a secret sharing system given as a first embodiment of the present invention.

FIG. 1 is a block diagram of a secret sharing system given as a first embodiment of the present invention. The secret sharing system comprises a secret sharing/reconstruction unit 1 for executing a secret sharing (secret reconstruction) process, a plurality of secret sharer units 2 for storing individual shared data parts and a client unit 3 that uses the service of the secret sharing/reconstruction unit 1, which are connected to one another via a network 4 for mutual communication. The secret sharing/reconstruction unit 1 consists of a server (computer) incorporated with a program for the secret sharing process which will be described hereinafter, and each secret sharer unit 3 consists of a personal computer (PC). In the illustrated embodiment, the secret sharing/reconstruction unit 1 is configured to perform the sharing and reconstruction of the secret data, but it may also use two separate pieces of hardware for performing the tasks of sharing and reconstructing the secret data, respectively.

In this secret sharing system, upon request from the client unit 3, the secret sharing/reconstruction unit 1 creates a plurality of shared data parts from the secret data according to a particular secret sharing scheme, and each shared data part is stored in the corresponding sharer unit 2. The secret sharing/reconstruction unit 1 is configured to reconstruct the secret data from the shared data upon request from the client unit 3 as mentioned earlier.

The term "secret data" as used herein may consist of any data (including not only the data proper but also other data associated with the data proper) which the user desires to be protected (from leaking to a third party), but may not be necessarily confidential to the public. The secret sharing system using the secret sharing/reconstruction unit 1 is not limited to that used in the illustrated embodiment, but may be modified in various ways in terms of the structures of the individual components thereof and the arrangement of the individual components. If desired, a single information processing device may be configured to perform all of the functions of the secret sharing system by using a PC and an associated storage unit.

Figure 2:
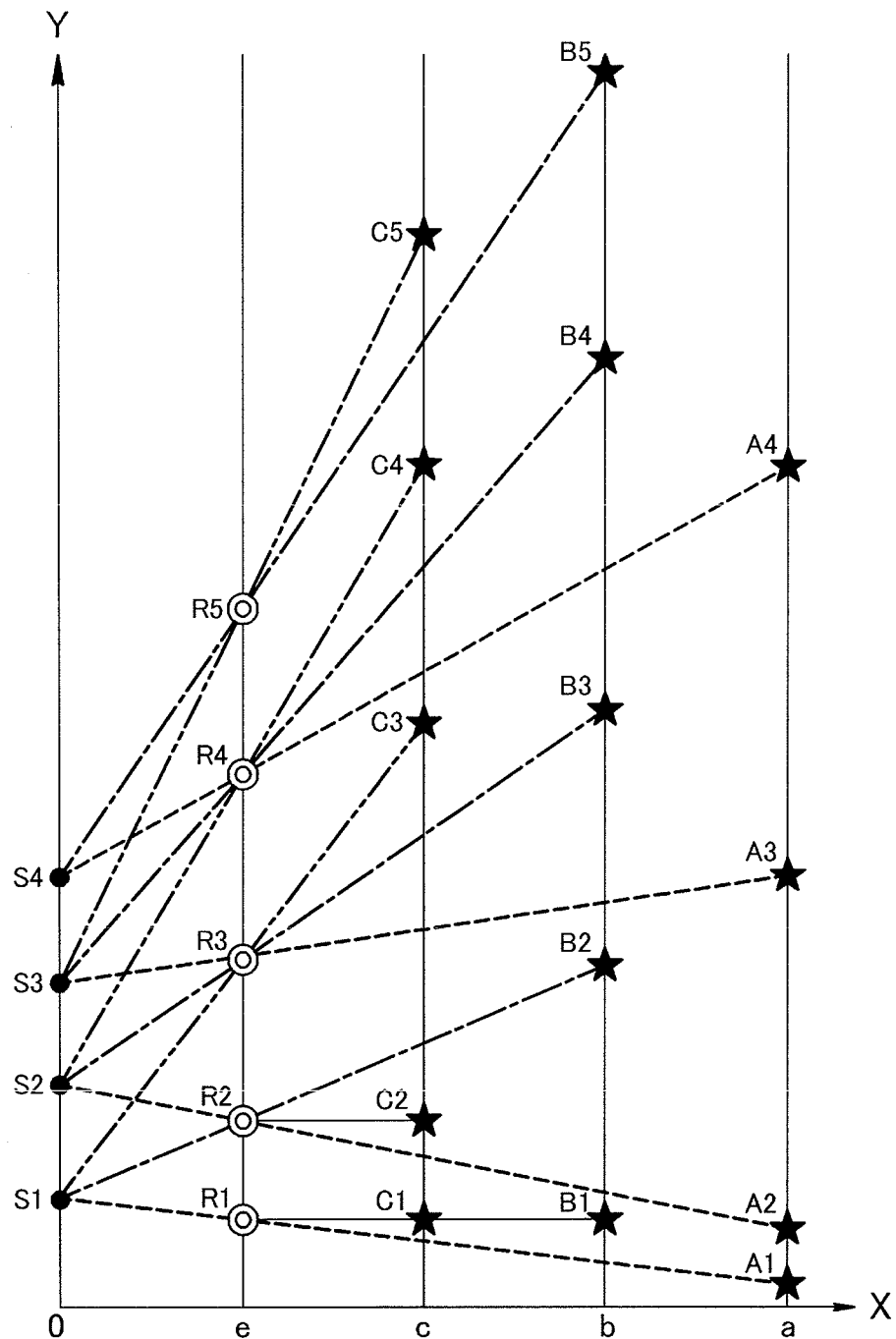
FIG. 2 is a diagram illustrating the process of sharing secret data according to the secret sharing method of the first embodiment.
Figure 3:
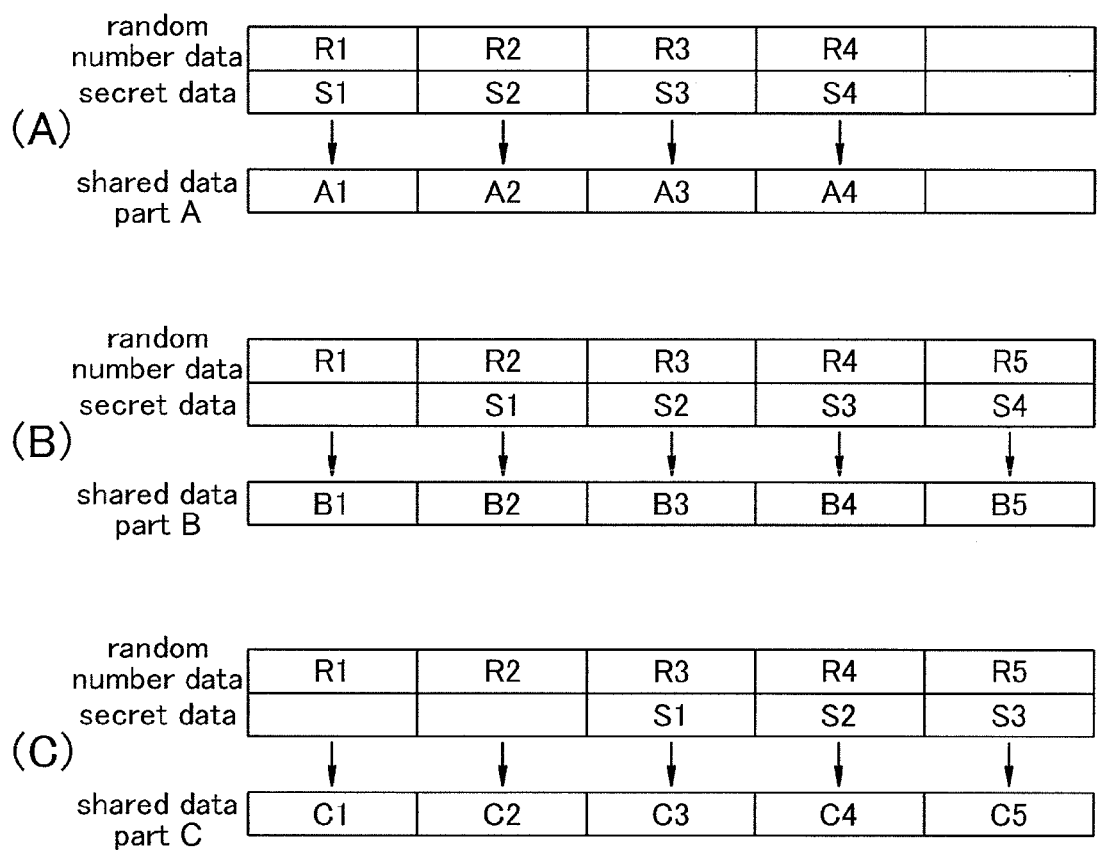
FIG. 3 is a diagram illustrating the process of creating shared data pieces of each shared data part according to the secret sharing method of the first embodiment, (A), (B) and (C) showing how shared data part A, shared data part B and shared data part C are created, respectively.

FIG. 2 is a diagram illustrating the process of sharing secret data in the secret sharing system shown in FIG. 1, and FIG. 3 is a diagram illustrating the process of creating shared data in the process of sharing secret data.

Figure 27:
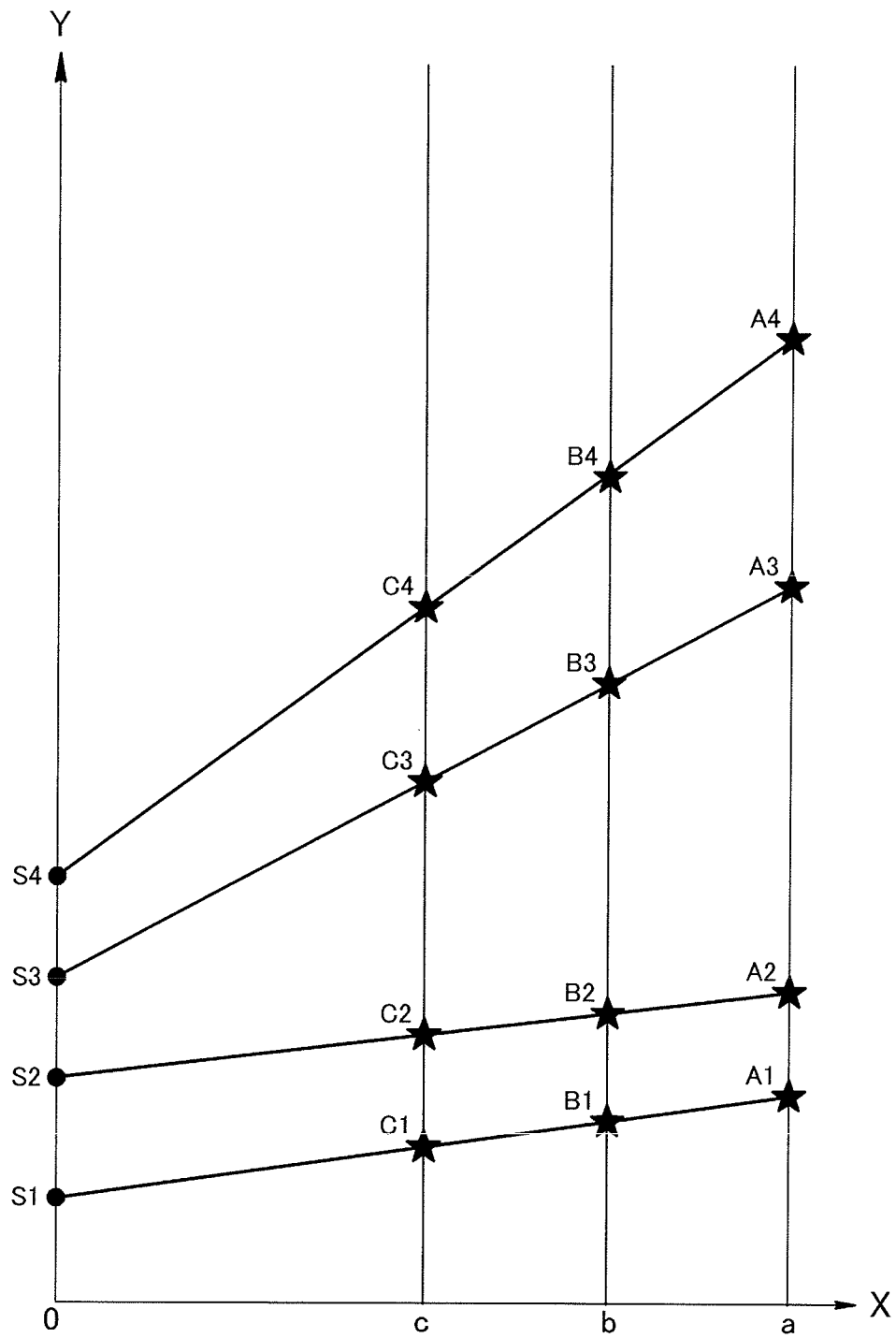
FIG. 27 is a diagram showing a process of sharing secret data according to the conventional threshold scheme given for comparison with the first embodiment.

To facilitate the understanding of the secret sharing process of the first embodiment, a secret sharing process based on the conventional Shamir's (k, n) threshold scheme (threshold k=2, number of participants n=3) is described in the following with reference to FIG. 27. In FIG. 27, secret data S consists of four secret data pieces S1 to S4, and each of the three shared data parts A to C consists of four secret data pieces Ai, Bi, Ci (i=1, 2, 3, 4).

For the convenience of description, it is selected such that the X values of the secret data pieces S in the XY coordinate system are zero, and the X values of the shared data parts A to C are fixed values a, b and c, respectively. This also applies to FIG. 2 and other remaining description of the present invention). Thereby, the secret data pieces S1 to S4 can be expressed by the Y values on line X=0 (black dots in FIG. 27). The shared data pieces A1 to A4 of the shared data A can be expressed by the Y values A1 to A4 on line X=a (black stars in FIG. 27). The remaining shared data parts B and C can be expressed in a similar manner. In practice, the user can freely select the X values and Y values for the secret data S, and the X values and Y values for the shared data A to C can be freely selected from any fixed numbers or random numbers. The lines in the diagram of this example are selected so as not to cross one another by setting S1<S2<S3<S4 and being given with inclinations in an appropriate manner for the convenience of illustration, but may cross one another depending on the relationship between the magnitudes of S1 to S4 and the inclinations of the lines. Similarly, in the mathematical functions and diagrams of the following examples, the lines or curves in the diagram are selected so as not to cross one another by setting S1>S2>S3>S4 and setting various values in an appropriate manner for the convenience of illustration, but may cross one another in practice.

According to the conventional threshold scheme, curves defined by polynomials of a prescribed order (threshold value k−1) (lines in the case of k=2) are used for the creation of shared data parts. Because the threshold value k=2 in this case, lines represented by $Y=\alpha X+\beta$ (Eq. 1) are used. Therefore, the secret data pieces S1 to S4 are given by the Y intercepts $\beta$ in Eq. 1. The inclinations (the inclination angle $\alpha$ in Eq. 1) of four lines that pass through the points (0, S1), (0, S2), (0, S3) and (0, S4) representing the secret data pieces S1 to S4, respectively, are determined from random numbers as shown in FIG. 27. Then, the Y values at the intersections between these lines and X=a, X=b and X=c give the shared data pieces Ai, Bi and Ci (i=1, 2, 3, 4), respectively.

If there are fewer shared data parts A to C than the threshold value k, the curves (or lines when k=2) that were used for creating the shared data cannot be determined so that a third party possessing only a small part of the shared data is unable to reconstruct the secret data S. However, if a third party possesses k or more shared data parts, the third party can determine the curves used for the creation of the shared data parts, and can thereby reconstruct the secret data.

The details of the secret sharing process performed in the secret sharing/reconstruction unit 1 are described in the following with reference to FIGS. 2 and 3. It is assumed, as in the case of FIG. 27, that the threshold value k=2 and the number of participants n=3, and that the secret data S is shared as three shared data parts A, B and C in the XY coordinate system.

The secret data S and the shared data parts A to C are similar to those of the conventional arrangement shown in FIG. 27 except for that each of the shared data part B and C consists of a larger number of shared data pieces Bi, Ci (i=1, 2, 3, 4, 5) by one. As opposed to the conventional arrangement shown in FIG. 27, random number data R (data for secret sharing computation) is newly introduced in the sharing process. The random number data R consists of five random number data pieces, and is to be used for the creation of the shared data parts A to C jointly with the secret data S as will be described hereinafter. In the case of this random number data R also, similarly as in the case of the secret data S and the shared data parts A to C discussed above, the X value for the random number data R is given as a fixed value e. Thus, the random number data pieces R1 to R5 can be expressed as the Y values on the line X=e (double circles in FIG. 2). The random number data preferably consists of physical random numbers.

In the sharing process executed by the secret sharing/reconstruction unit 1, first of all, the values of the random number data R (random number data pieces R1 to R5) are determined, and the shared data parts A to C are created according to the random number data R and the secret data S. More specifically, by using a prescribed mathematical function (such as exclusive logical sum) of a secret data piece and a random number data piece, each shared data piece is created. For instance, as shown in FIG. 2, a line connecting the secret data piece S1 with each random number data piece R1, R2, R3 is obtained, and the Y values of the intersections of these lines with X=a, X=b and X=c are determined as corresponding shared data pieces A1, B2 and C3, respectively. Then, a line connecting the secret data piece S2 with each random number data piece R2, R3, R4 is obtained, and the Y values of the intersections of these lines with X=a, X=b and X=c are determined as corresponding shared data pieces A2, B3 and C4, respectively. Further, a line connecting the secret data piece S3 with each random number data piece R3, R4, R5 is obtained, and the Y values of the intersections of these lines with X=a, X=b and X=c are determined as corresponding shared data pieces A3, B4 and C5, respectively. Lastly, a line connecting the secret data piece S4 with each random number data piece R4, R5 is obtained, and the Y values of the intersections of these lines with X=a and X=b are determined as corresponding shared data pieces A4 and B5, respectively. To simplify the reconstruction of the secret data S as will be described hereinafter, it is set that B1=C1=R1, and C2=R2.

The combination or association between the secret data and the random number data is not limited to that used in the illustrated embodiment, but may be performed in a number of different ways without departing from the spirit of the present invention. Also, it is not necessary that all of the secret data pieces S1 to S4 are associated with each of the radon number data pieces R1 to R5.

As shown in (A), (B) and (C) in FIG. 3, each shared data piece is obtained from a particular combination of a single secret data piece and a single radon number data piece, except for a part of the shared data pieces B1, C1 and C2 which use the values of the random number data pieces as they are. FIG. 3 shows that, in each of (A), (B) and (C), each piece of the shared data part (given in the third row) can be obtained as the Y value of an intersection between a line passing through the corresponding secret data piece and random number data piece (given in the first and second rows, respectively), and the line X=a, X=b or X=C, as the case may be, as indicated by an arrow. As opposed to the conventional threshold scheme where a plurality of secret data pieces are located on a same line (See FIG. 27), the different shared data pieces are located on different lines in the secret sharing system of the illustrated embodiment. In other words, as can be seen in the lines connecting Ai and Ri, Bi and Ri, and Ci and Ri, each line carries only one piece of the shared data Ai, Bi, Ci. By removing the information on the random number data R from the shared data, a secret sharing by the shared data with a threshold value of 2 and 3 participants (k=2, n=3) can be achieved. In (A), (B) and (C) of FIG. 3, some of the pieces of the shared data parts B1, C1 and C2 are derived directly from the random number data R1, R2 without the secret data involving in any way.

Here, the data pieces sharing a same X value or those on a same vertical line (such as X=0, e, a, b and c) are considered as belonging to a same group. This definition of the term "group" applies also to the description of other embodiments of the present invention. Therefore, in the illustrated embodiment, the shared data pieces are created from data pieces for secret sharing computation belonging to different groups of data pieces. Also, the shared data pieces are created from different combinations of data pieces for secret sharing computation.

In (A) of FIG. 3, each secret data piece S1 to S4 is combined with the corresponding random number data piece R1 to R4 to create the corresponding shared data piece A1 to A4. In (B) of FIG. 3, each secret data piece S1 to S4 is combined with the corresponding random number data piece R2 to R5 to create the corresponding shared data piece B2 to B5. However, the first shared data piece B1 is copied from the corresponding random number data piece R1, and the positions of the secret data pieces are shifted by one position with respect to the random number data pieces. In (C) of FIG. 3, each secret data piece S1 to S4 is combined with the corresponding random number data piece R3 to R5 to create the corresponding shared data piece C3 to C5. However, the first two shared data pieces C1 and C2 are copied from the corresponding random number data pieces R1 and R2, respectively, and the positions of the secret data pieces are shifted by two positions with respect to the random number data pieces.

The secret data pieces S1 to S4 and the random number data pieces R1 to R5 may be combined in different ways from that used in the illustrated embodiment without departing from the spirit of the present invention as long as the selected combination allows the secret data S to be reconstructed. The secret data pieces S1 to S4 may be individual data pieces that are required to be individually protected, but may also consist of pieces of data which are required to be protected as a whole. If desired, part of the secret data pieces may consist of stuffed data or unnecessary data.

How the security of the secret data S can be achieved by the secret sharing/reconstruction unit 1 of the illustrated embodiment is discussed in the following.

In the conventional threshold scheme shown in FIG. 27, the inclinations a of the lines in Eq. 1 were given as random numbers, but it is no different from giving one of the shared data parts A to C as random number data. In other words, for instance, when the shared data pieces C1 to C4 (Y values when X=c) of the shared data part C shown in FIG. 27 are given as random number data pieces, and lines are generated by connecting the shared data pieces C1 to C4 with corresponding secret data pieces S1 to S4, respectively, the inclinations of these lines are automatically determined at the same time. The shared data pieces A1 to A4 and B1 to B4 forming the shared data parts A and B can be obtained as the Y values at the intersections of these lines with X=a and X=b.

In the scheme illustrated in FIG. 2, three pairs of shared data parts A and R, B and R, and C and R are created from the secret data as shared data with the threshold value k=2 and the number of participants n=2, and the information on the random number data R is dropped out to create shared data with the threshold value k=2 and the number of participants n=3. Therefore, the level of security of this scheme is at least equivalent to that of the method of creating shared data parts A to C according to the conventional threshold scheme.

In the method of creating shared data parts A to C executed by the secret sharing/reconstruction unit 1, some of the shared data pieces are directly borrowed from the random number data pieces of the random number data (B1=C1=R1, and C2=R2), but using random number data for some of the shared data does not adversely affect the security of the shared data parts A to C.

Figure 4:
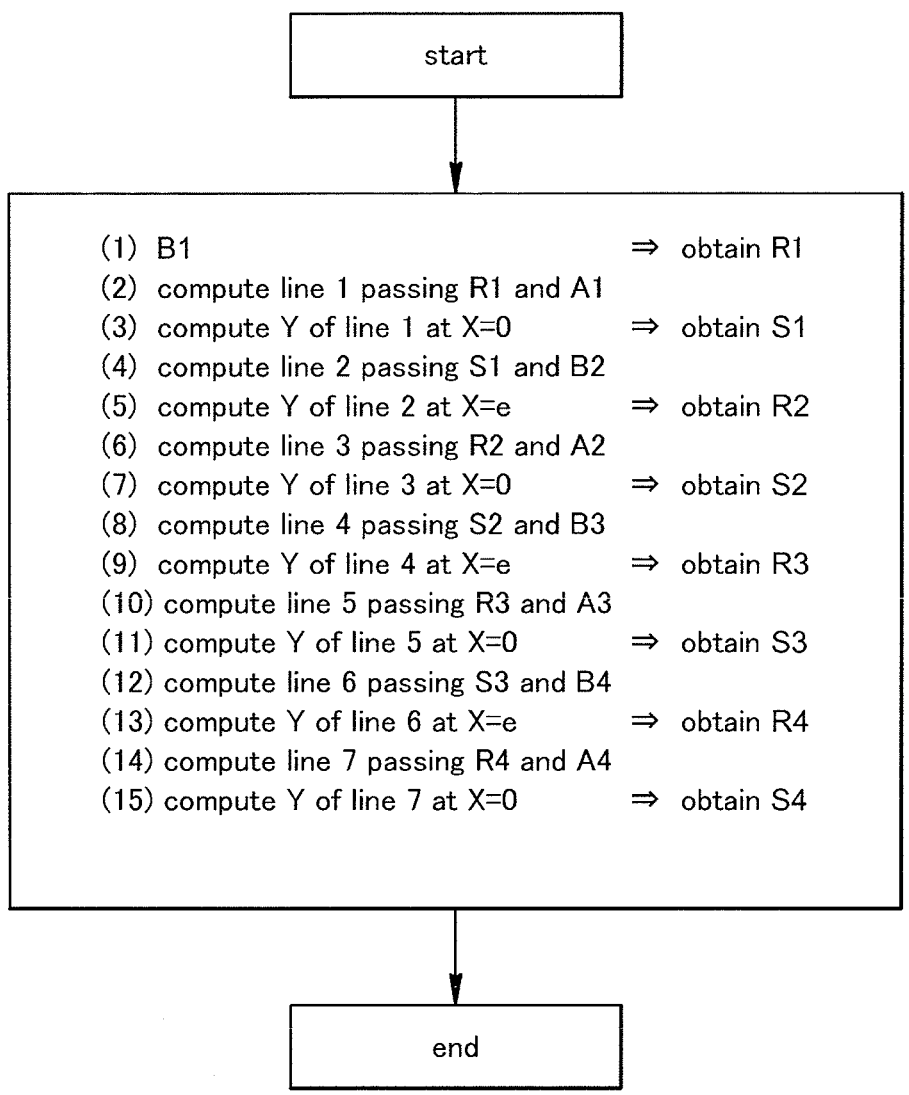
FIG. 4 is a flowchart showing the process of reconstructing the secret data from two of the shared data parts A and B shown in FIG. 3.
Figure 5:
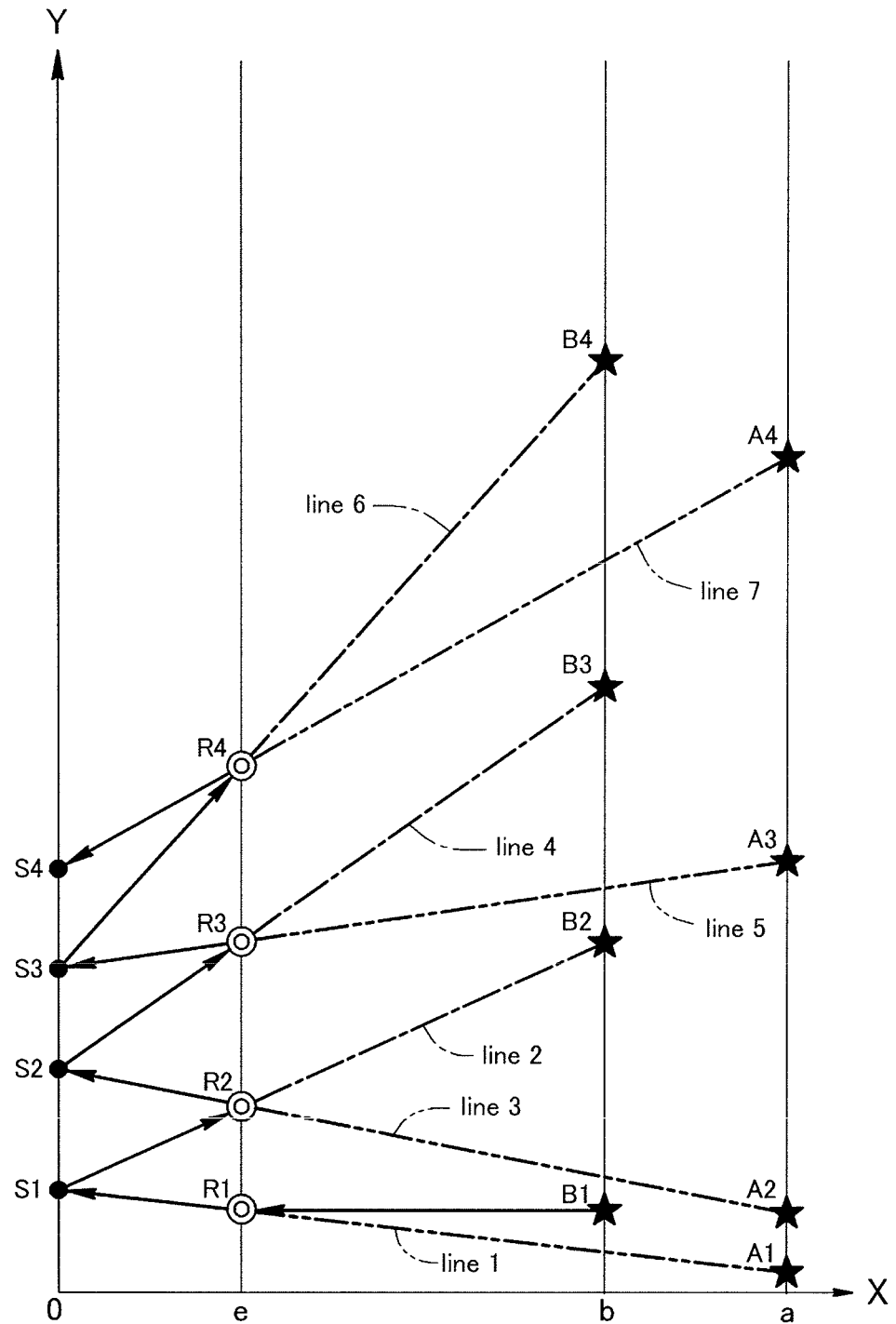
FIG. 5 is a diagram illustrating the process of reconstructing the secret data from two of the shared data parts A and B shown in FIG. 3.

FIG. 4 is a flowchart showing the process of reconstructing the secret data from two of the shared data parts A and B which is shown in FIG. 3, and FIG. 5 is a diagram illustrating this process.

In the process of reconstructing the secret data from the shared data parts A and B, steps (1) to (15) are executed in sequence as shown in FIG. 4. As a result, as indicated by the arrows in FIG. 5, the random number data pieces R1 to R4 and the secret data pieces S1 to S4 are obtained in a sequential manner.

More specifically, the secret sharing/reconstruction unit 1 obtains the random number data piece R1 from the shared data piece B1 of the shared data part B in step (1). A line 1 passing through the obtained random number data piece R1 and the shared data piece A1 is computed in step (2), and the secret data piece S1 is obtained by computing the Y value of the intersection between the line 1 and X=0 in step (3). A line 2 passing through the obtained secret data piece S1 and the shared data piece B2 is computed in step (4), and a random number data piece R2 is obtained by computing the Y value of the intersection between the line 2 and X=e in step (5). A line 3 passing through the obtained random number data piece R2 and the shared data piece A2 is computed in step (6), and the secret data piece S2 is obtained by computing the Y value of the intersection between the line 3 and X=0 in step (7).

A line 4 passing through the obtained secret data piece S2 and the shared data piece B3 is computed in step (8), and a random number data piece R3 is obtained by computing the Y value of the intersection between the line 4 and X=e in step (9). A line 5 passing through the obtained random number data piece R3 and the shared data piece A3 is computed in step (10), and the secret data piece S3 is obtained by computing the Y value of the intersection between the line 5 and X=0 in step (11). A line 6 passing through the obtained secret data piece S3 and the shared data piece B4 is computed in step (12), and a random number data piece R4 is obtained by computing the Y value of the intersection between the line 6 and X=e in step (13). Lastly, a line 7 passing through the obtained random number data piece R4 and the shared data piece A4 is computed in step (14), and a secret data piece S4 is obtained by computing the Y value of the intersection between the line 7 and X=0 in step (15).

Thus, the shared data parts A and B are obtained by creating shared data parts (A and R, and B and R) with the threshold value k=2 and the number of participants n=2 from the secret data, and dropping out the information on the common random number data (data for secret sharing computation) therefrom so that the random number data R can be reconstructed from the shared data parts A and B, and the secret data S can be reconstructed from the random number data R and the shared data parts A and B. As can be appreciated from the foregoing, the knowledge of only one of the shared data parts A and B is not adequate for reconstructing the random number data R, and is therefore not adequate for reconstructing the secret data S.

Figure 7:
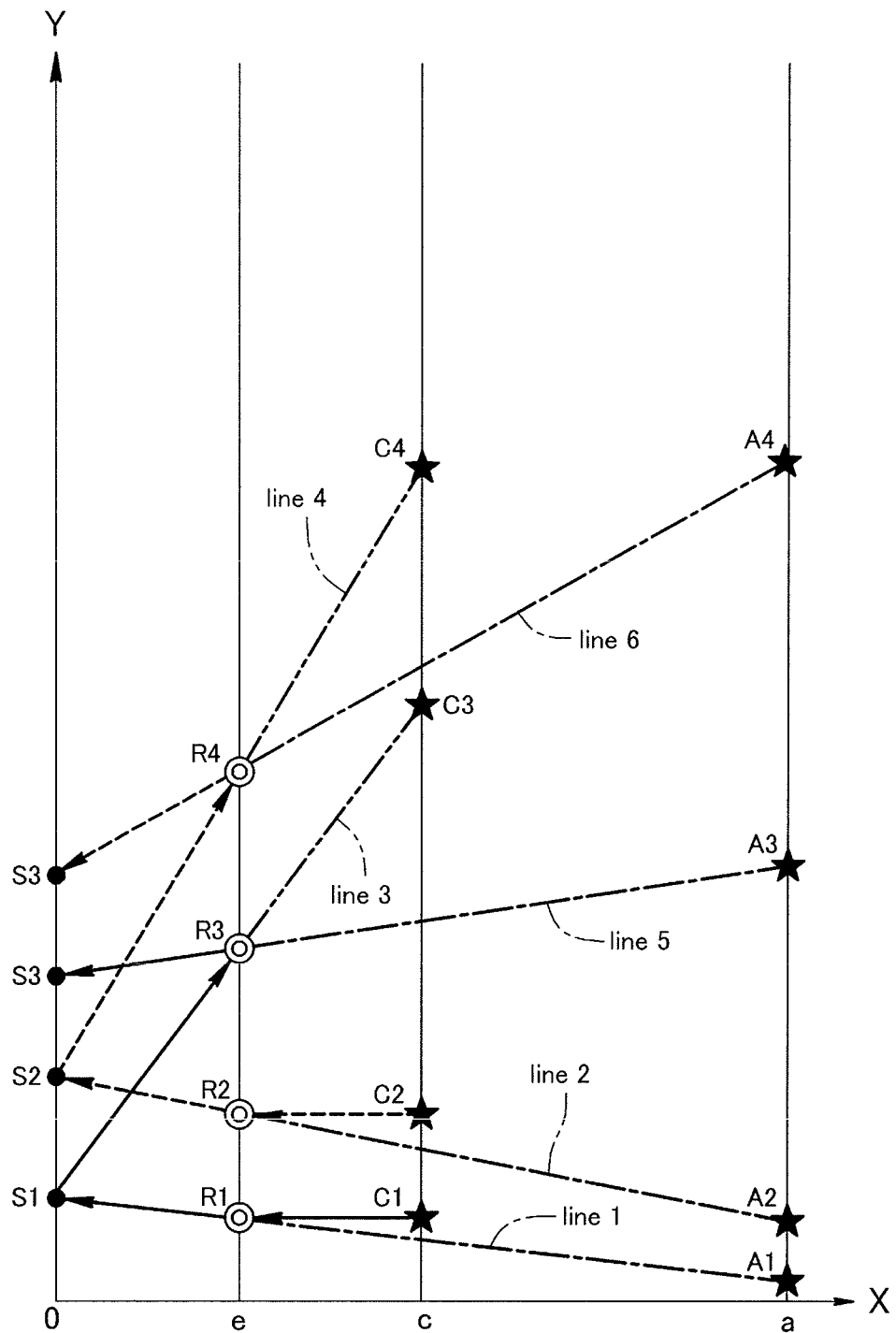
FIG. 7 is a diagram illustrating the process of reconstructing the secret data from two of the shared data parts A and C shown in FIG. 3.

FIG. 6 is a flowchart showing the process of reconstructing the secret data from the two shared data parts A and C shown in FIG. 3, and FIG. 7 is a diagram illustrating the process of reconstructing the secret data. FIGS. 6 and 7 are similar to FIGS. 4 and 5, respectively, which are based on the shared data parts A and B.

In the process of reconstructing the secret data from the shared data parts A and C, steps (1) to (14) are executed in sequence as shown in FIG. 6. As a result, as indicated by the arrows in FIG. 7, the random number data pieces R1 to R4 and the secret data pieces S1 to S4 are obtained in a sequential manner.

As steps (1) to (14) in FIG. 6 are executed in a similar fashion as the corresponding steps in FIG. 4, the details of such steps are omitted in the following description. It should be noted that steps (1), (3), (4), (7), (8), (11) and (12) in FIG. 6 starting from the step of acquiring the random number data piece R1 (corresponding to those indicated by solid line arrows in FIG. 7) can be executed independently from steps (2), (5), (6), (9), (10), (13) and (14) in FIG. 6 starting from the step of acquiring the random number data piece R2 (corresponding to those indicated by broken line arrows in FIG. 7).

Figure 8:
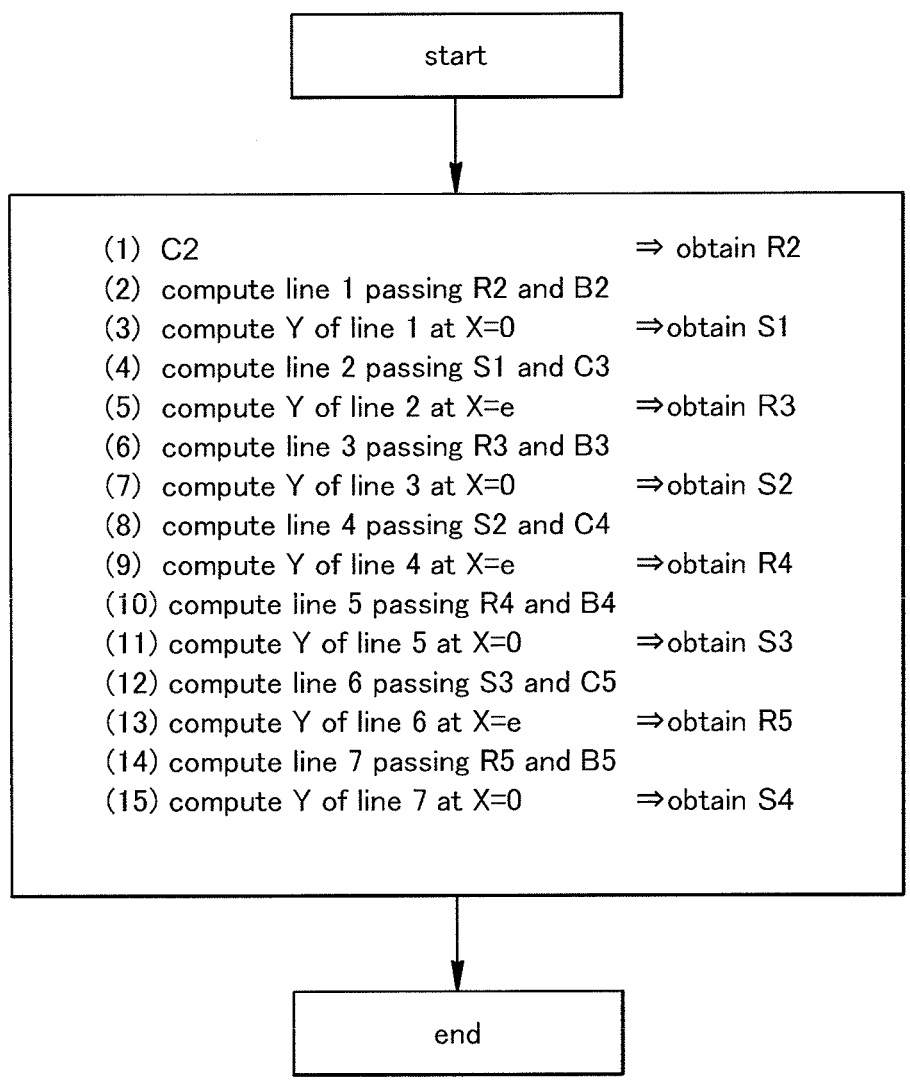
FIG. 8 is a flowchart showing the process of reconstructing the secret data from two of the shared data parts B and C shown in FIG. 3.
Figure 9:
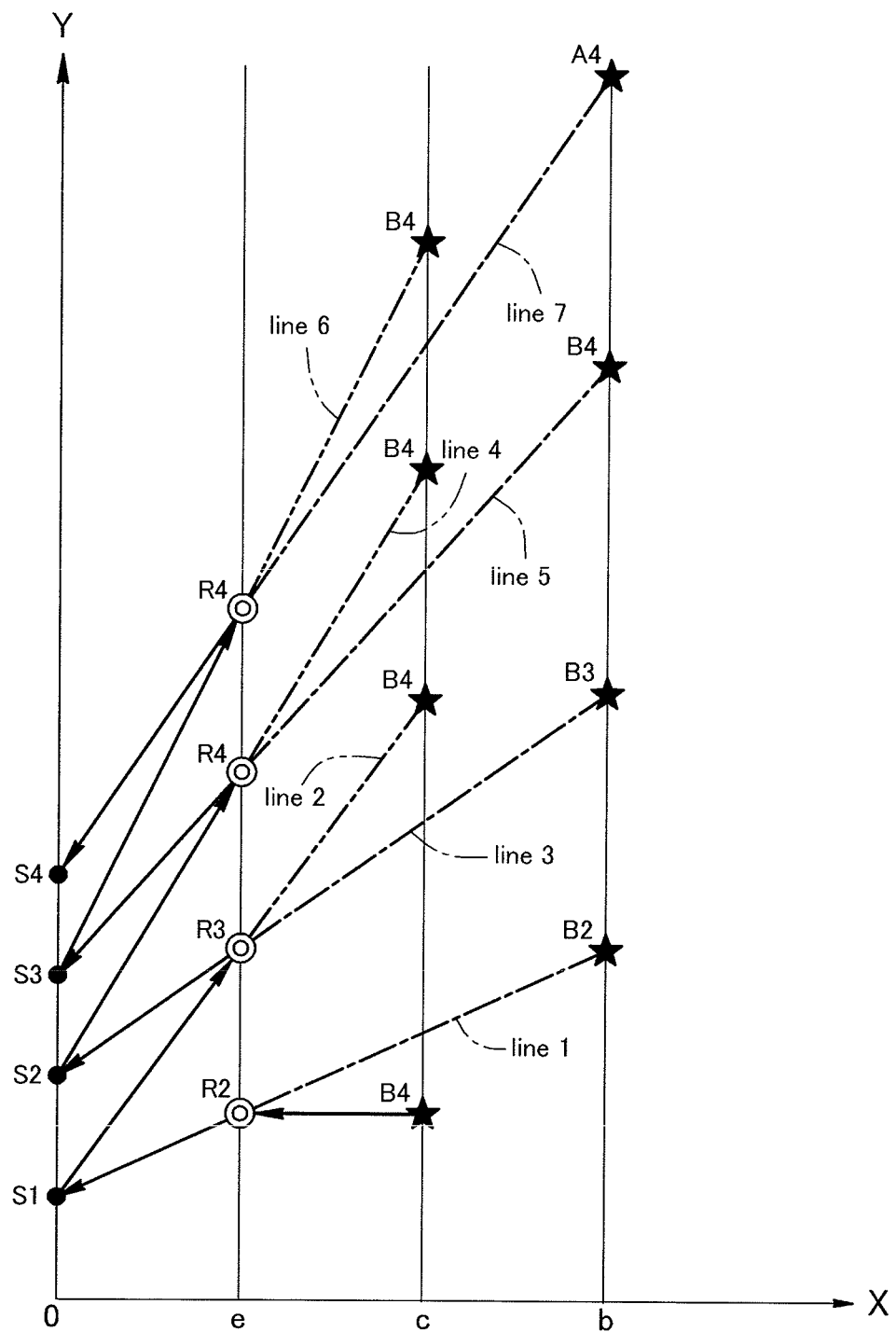
FIG. 9 is a diagram illustrating the process of reconstructing the secret data from two of the shared data parts B and C shown in FIG. 3.

FIG. 8 is a flowchart showing the process of reconstructing the secret data from two of the shared data parts B and C which is shown in FIG. 3, and FIG. 9 is a diagram illustrating this process. FIGS. 8 and 9 are similar to FIGS. 4 and 5, respectively, which are based on the shared data parts A and B.

In the process of reconstructing the secret data from the shared data parts B and C, steps (1) to (15) shown in FIG. 8 are executed in a sequence. Thereby, the random number data pieces R1 to R5 and the secret data pieces A1 to S4 can be obtained in a sequential manner. As steps (1) to (15) shown in FIG. 8 are similar to those shown in FIG. 4 and FIG. 6, the details of such steps are omitted in the following description.

Suppose that the secret sharing/reconstruction unit 1 has created a plurality of pairs (three pairs in the illustrated embodiment) of shared data parts. When k (threshold value) or more pairs of the shared data parts are obtained, the secret data can be reconstructed by using (k−1) (one in the illustrated embodiment) pair of random number data parts (data parts for secret sharing computation). On the other hand, when less than k pairs of shared data parts are obtained, it is not possible to reconstruct the secret data.

Figure 10:
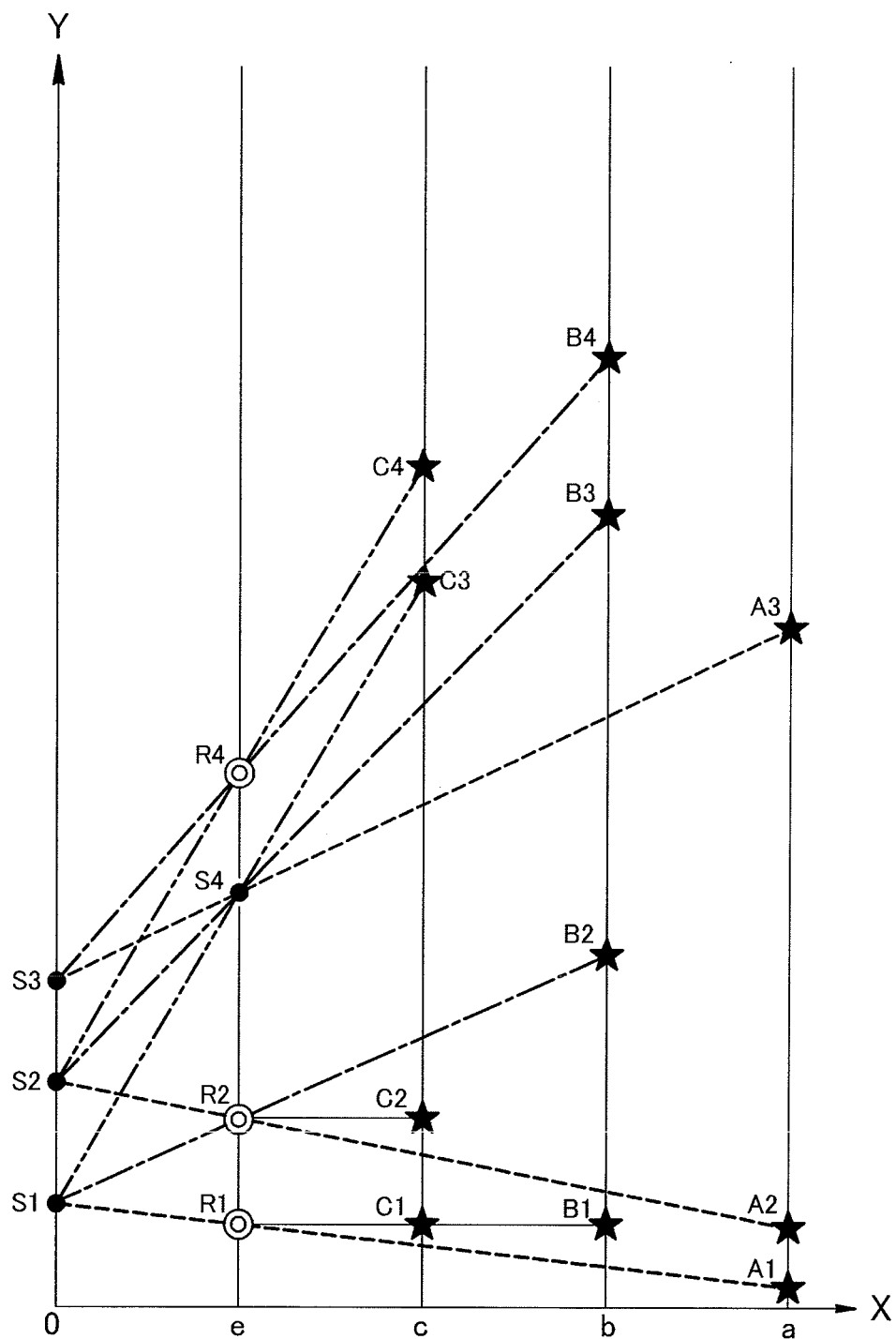
FIG. 10 is a diagram similar to that of FIG. 2 showing a modification of the first embodiment.

FIG. 10 shows a diagram illustrating a method of creating shared data parts which is modified from that of the first embodiment. Random number data was used as data for secret sharing computation in the foregoing embodiment, but, in the modified embodiment given in the following, any data other than random number data can be used as the data for secret sharing computation as long as this data is not known to a third party.

Here, the secret data piece S4 is used in place of one of the random number data piece R3 which was used in the example shown in FIG. 2. By thus replacing a part or all of the data for secret data computation, an advantage can be gained in reducing the data volume of the shared data parts A to C. This can be considered as a ramp secret sharing scheme. The data that is to replace a part or all of the random number data pieces is not required to be a secret data piece but may consist of a data piece obtained by converting or modifying a part of the secret data in such a manner that the secret data can be reconstructed as required.

Figure 11:
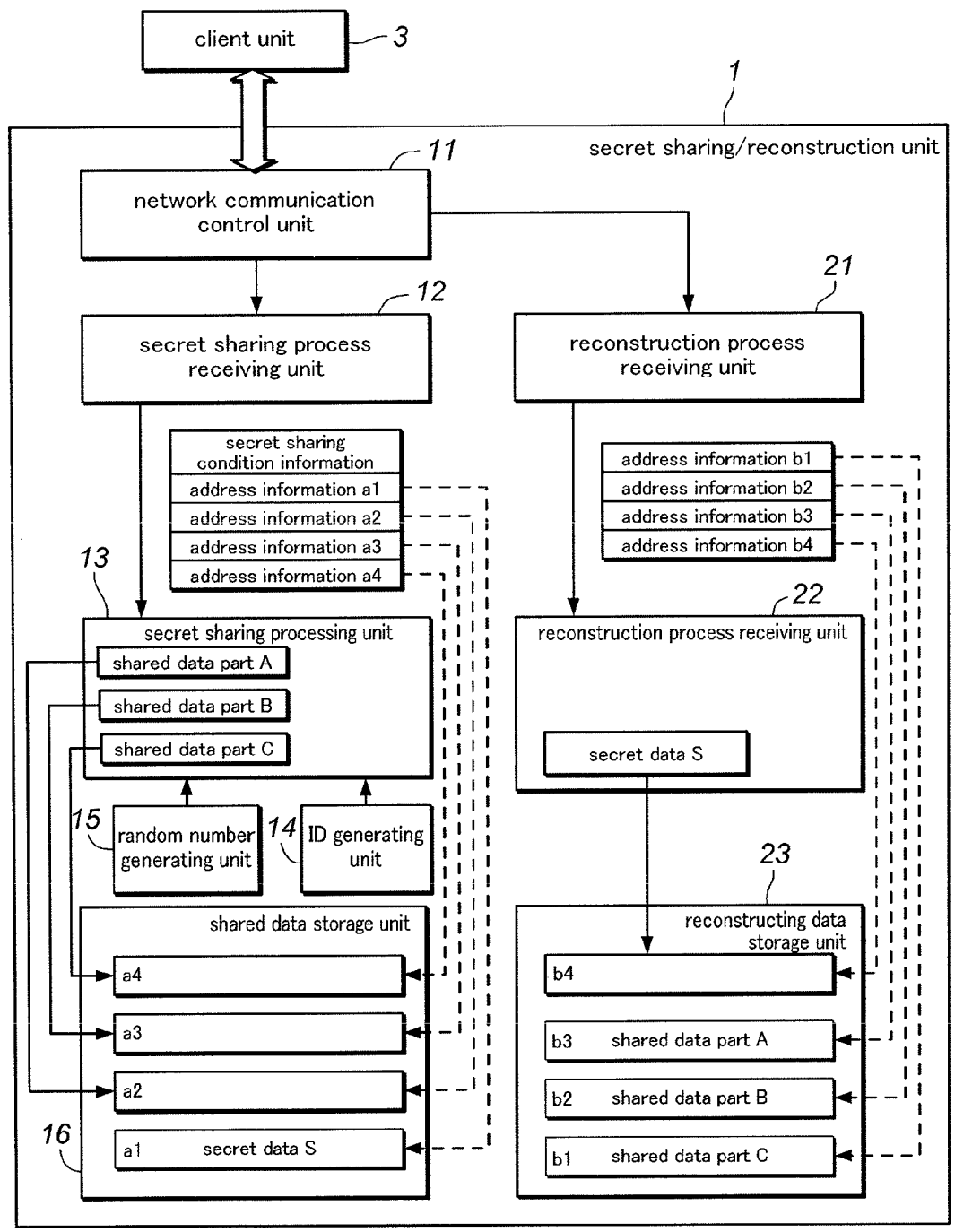
FIG. 11 is a more detailed functional block diagram of the secret sharing system shown in FIG. 1.

FIG. 11 shows a more detailed functional block diagram of the secret sharing/reconstruction unit 1 shown in FIG. 1. The secret sharing/reconstruction unit 1 comprises a network communication control unit 11 consisting of a communication module for transmitting and receiving commands and data on secret sharing to and from the client unit 3 via the network 4 (see FIG. 1), a secret sharing process receiving unit 12 for receiving a request for the secret sharing of the secret data S from the client unit 3, a secret sharing processing unit (shared data creating unit) 13 for executing the secret sharing process for the secret data S according to a prescribed secret sharing scheme, an ID generating unit 14 for generating IDs for identifying the shared data parts A to C created by the secret sharing processing unit 13, a random number generating unit 15 for generating the random number data R used for creating the shared data parts A to C, a shared data storage unit (secret data storage unit) 16 consisting of memory for storing data on the secret sharing process, a reconstruction process receiving unit 21 for receiving a request for reconstructing the secret data S from the client unit 3, a reconstruction processing unit 22 for executing the process of reconstructing the secret data S, and a reconstructing data storage unit 23 consisting of memory for storing data on the reconstruction process.

Although not shown in the drawings, the secret sharing/reconstruction unit 1 includes various per se known pieces of hardware such as a CPU responsible for the overall control of the secret sharing/reconstruction unit 1, RAM serving as work memory and a HDD or other storage device for storing the computer program for the secret sharing process and the secret reconstructing process. Thus, the functions of the secret sharing process receiving unit 12, the secret sharing processing unit 13, the reconstruction process receiving unit 22 and the reconstructing data storage unit 23 may be performed by the CPU which operates under the computer program for the secret sharing process (as a software process). However, a part of the functions of these components may also be executed by dedicated hardware. The shared data storage unit 16 and the reconstructing data storage unit 23 may consist of not only non-volatile memory but also volatile memory such as RAM.

The mode of operation of the secret sharing/reconstruction unit 1 shown in FIG. 11 in performing the secret sharing process is described in the following. Upon receiving a request for a secret sharing process from the client unit 3, the secret sharing process receiving unit 12 sends out corresponding secret sharing condition information and address information a1 to a4 (which may be acquired along with the request or created by the secret sharing process receiving unit 12 upon receiving the request) to the secret sharing processing unit 13. The secret sharing condition information may include information required for the secret sharing processing unit 13 to perform the secret sharing process such as the number participants n (3, in the illustrated embodiment) and the threshold value k (2, in the illustrated embodiment). The address information a1 consists of information on the location where the secret data S to be shared is stored (the address information of the shared data storage unit 16 in the illustrated embodiment), and the address information a2 to a4 consists of information on the locations where the shared data parts A to C created for the secret sharing are going to be stored (the address information of the shared data storage unit 16 in the illustrated embodiment).

The secret data S that is to be shared is stored in the shared data storage unit 16 in advance. The secret data S is received in advance from the client unit 3, but may also be acquired from a portable storage medium such as USB memory, or may be created by the secret sharing/reconstruction unit 1.

Upon receiving the secret sharing condition information from the secret sharing process receiving unit 12, the secret sharing processing unit 13 executes the secret sharing process discussed above according to the received secret sharing condition information. At that time, the secret data S read out from the shared data storage unit 16 according to the address information a1 and the random number data part R generated by the random number generating unit 15 are used for the secret sharing process. The number of the random number data parts (data for secret sharing computation) is smaller than k at least by one (as k=2 in this case, there will be only one random number data part). Each of the shared data parts A to C is assigned with an ID generated by the ID generating unit 14 as header information thereof. The IDs for identifying the shared data parts A to C may consist of fixed numbers or random numbers. The shared data parts A to C are stored in the shared data storage unit 16 according to the address information a2 to a4. The shared data parts A to C stored in the shared data storage unit 16 are separated from one another, and individually transmitted to the different sharer units 2 (see FIG. 1).

The secret sharing processing unit 13 may also use other prescribed data (kept secret from the third party) entered by a user or the secret data itself, instead of the random number data R generated by the random number generating unit 15. The locations for storing the shared data parts A to C are not limited to the sharer units 2, but may also be kept stored in the shared data storage unit 16.

The mode of operation of the secret sharing/reconstruction unit 1 shown in FIG. 11 in performing the secret reconstruction process is described in the following. Upon receiving a request for a reconstruction process from the client unit 3, the reconstruction process receiving unit 21 sends out address information b1 to b4 (which may be acquired along with the request or created by the reconstruction process receiving unit 21 upon receiving the request) to the reconstruction processing unit 22. The address information b1 to b3 consists of information on the locations for storing the shared data parts A to C on which the reconstruction process will be based (the address information of the reconstructing data storage unit 23 in the illustrated embodiment), and the address information b4 consists of information on the location for storing the secret data S which will be reconstructed by the secret reconstructing process (the address information of the reconstructing data storage unit 23 in the illustrated embodiment).

The shared data parts A to C that are to be used for the secret reconstructing process are either received from a storage device (such as the sharer units 2) or stored in the reconstructing data storage unit 23 in advance. In FIG. 11, all of the shared data parts A to C are stored in the reconstructing data storage unit 23, but it suffices if a same number of shared data parts as the threshold value or more are stored in the reconstructing data storage unit 23.

Upon receiving the address information b2 to b4 from the reconstruction process receiving unit 21, at least a number (k) of shared data parts that are required to reconstruct the secret data S are read out from the reconstructing data storage unit 23 according to the information received from the reconstruction process receiving unit 21. At this time, the reconstruction processing unit 22 is allowed to determine if each of the read out shared data parts is suitable for use from the header information (ID) thereof. Then, the reconstruction processing unit 22 executes the secret reconstructing process discussed above. The reconstructed secret data S is stored in the reconstructing data storage unit 23 at an address corresponding to the address information b4.

The secret data S stored in the reconstructing data storage unit 23 is transmitted to each client unit 3 as required. Alternatively, upon request from each client unit 3, the secret sharing/reconstruction unit 1 processes the secret data S in an appropriate manner.

The threshold value and the number of participants for the secret sharing process and the secret data reconstructing process discussed above can be modified as required, and the secret sharing condition information and the address information may be modified in a corresponding manner. It is also possible to have other information processing units perform part of the functions of the secret sharing/reconstruction unit 1 shown in FIG. 11. For instance, the secret sharing process and the secret data reconstructing process may be performed by different information processing units.

Second Embodiment

FIG. 12 is a diagram illustrating the process of creating shared data parts in the secret sharing process of a second embodiment of the present invention, and FIGS. 13 to 18 are diagrams illustrating the various steps of creating the shared data parts. In the second embodiment, the threshold value and the number of participants (k=3 and n=4) are changed from those of the first embodiment. Please note that some of the subject matters common to the first embodiment are omitted in the following description of the second embodiment.

Figure 28:
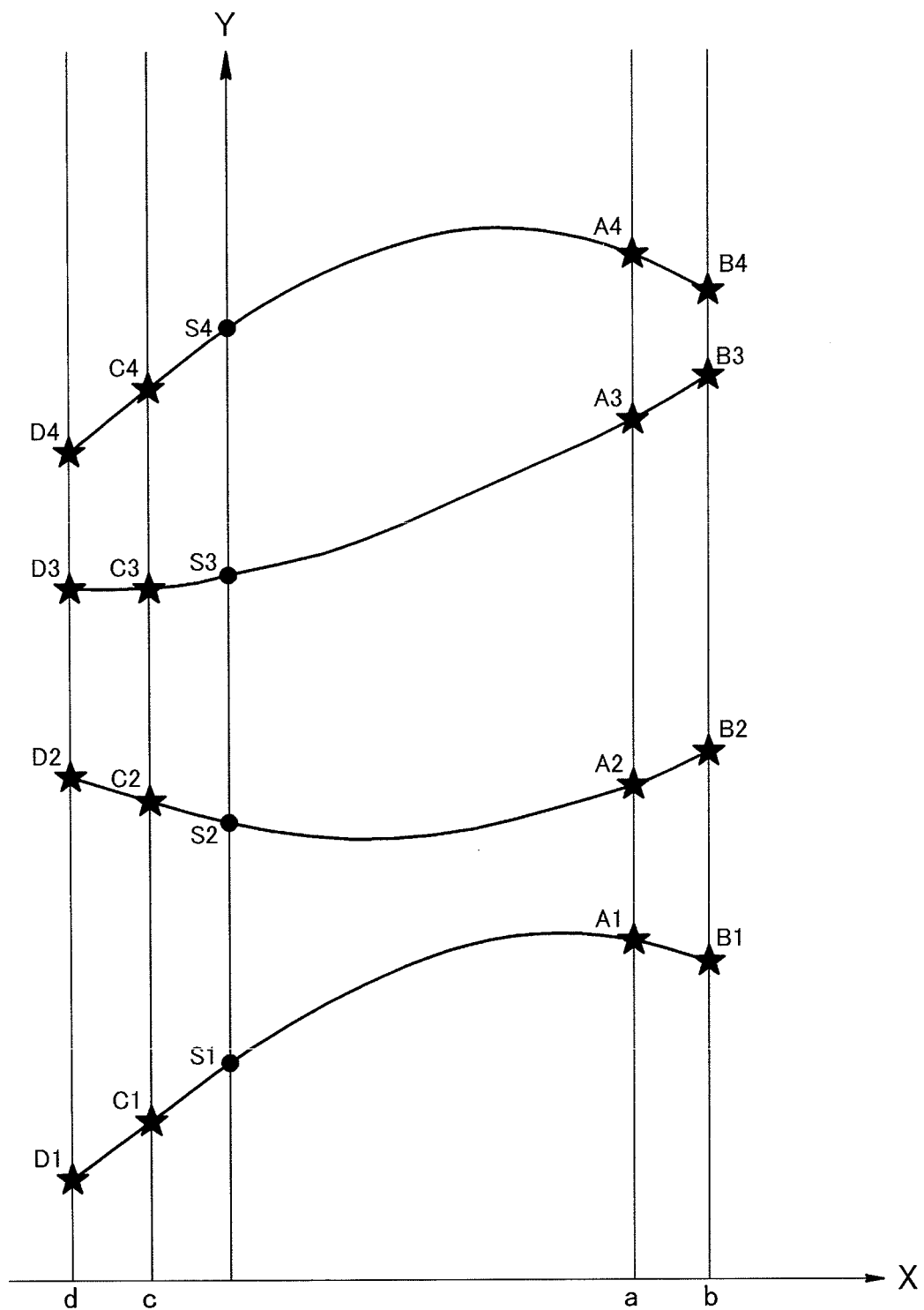
FIG. 28 is a diagram showing another process of sharing secret data according to the conventional threshold scheme given for comparison with the third embodiment.

To facilitate the understanding of the secret sharing process according to the present invention, the conventional Shamir's threshold scheme (k=3 and n=4) is described in the following with reference to FIG. 28. FIG. 28 shows a case where secret data S is shared by four participants as shared data parts A to D in the XY coordinate system. Each of the created shared data parts A to D consists of four shared data pieces Ai to Di (i=1, 2, 3, 4). The X values of the shared data parts A to D in the XY coordinate system are given by fixed values a to d, respectively.

In this conventional threshold scheme, as the threshold value k=3, the quadratic curve represented by $Y=\alpha X^2+\beta X+\gamma$ (Eq. 2) is used. Therefore, the secret data pieces S1 to S4 are given by the Y intercepts of the corresponding quadratic curves. If the values of $\alpha$ and $\beta$ of the quadratic curves passing through points (0, S1), (0, S2), (0, S3) and (0, S4) representing the respective secret data pieces S1 to S4 are given by random numbers, the Y values of these quadratic curves at X=a, X=b, X=c and X=d can be determined as shared data pieces Ai to Di (i=1, 2, 3, 4).

When the secret data S is shared as shared data parts A to D (or split into shared data parts A to D), the knowledge of a fewer number of shared data parts A to D than the threshold value is not adequate for reconstructing the secret data, but the knowledge of the same number of shared data parts A to D as the threshold value or more allows the secret data to be reconstructed.

The details of the secret sharing process of the second embodiment of the present invention are described in the following with reference to FIGS. 12 to 18. In this secret sharing process, the secret data S is shared as shared data parts A, B, C and D with the threshold value k=3 and the number of participants n=4 similarly as in the example shown in FIG. 28.

The scheme used in the second embodiment is similar to that shown in FIG. 28 except for that there are three more shared data pieces Ai and Di (i=1 to 7) for each of the shared data parts A and D, and two more shared data pieces Bi and Ci (i=2 to 7) for each of the shared data parts B and C. However, as opposed to the example of FIG. 28, two random number data parts R and r are newly introduced into the secret sharing process. Each of these random number data parts R and r consists of seven random number data pieces Rj, rj (j=1 to 7) which are used, along with the secret data S, for the creation of the shared data parts A to D as will be discussed hereinafter. The X values for the first and second random number data parts R, r are selected as fixed values e and f, respectively, similarly as the secret data S and the shared data A to D discussed above. Therefore, in the XY coordinate system, the random number data pieces R1 to R7 and r1 to r7 are given by the Y values at X=e and X=f, respectively (double circles in FIGS. 13 to 18).

In the secret sharing process executed by the secret sharing/reconstruction unit 1, the values for the first and second random number data pieces R1 to R7 and r1 to r7 of the first and second random number data parts R and r are determined, and the shared data parts A to D are then created from the first and second random number data parts R and r and the secret data S.

As shown in (A) to (D) of FIG. 12, the shared data part A, B, C, D (given in the last row) are each created, as indicated by arrows, from the first and second random number data parts (given in the first and third rows, respectively) and the secret data S (given in the second line). When there is only one random number data piece and nothing to be combined with as in the case of the shared data pieces A1, A2, A3, B2, C2, D1, D2 and D3, in each case, the random number data piece is directly used for the corresponding shared data piece or A1=R1, A2=R2, A3=R3, B2=R1, C2=r1, D1=r1, D2=r2 and D3=r3. Where there are two random number data pieces and no secret data piece as in the case of the shared data pieces B3 and C3, the lines passing through the corresponding random number data pieces are used for the creation of the shared data parts. When there are two random number data pieces and one secret data piece in the upper three rows, a single shared data piece is created from the two random number data pieces and the secret data piece in each case.

Figure 13:
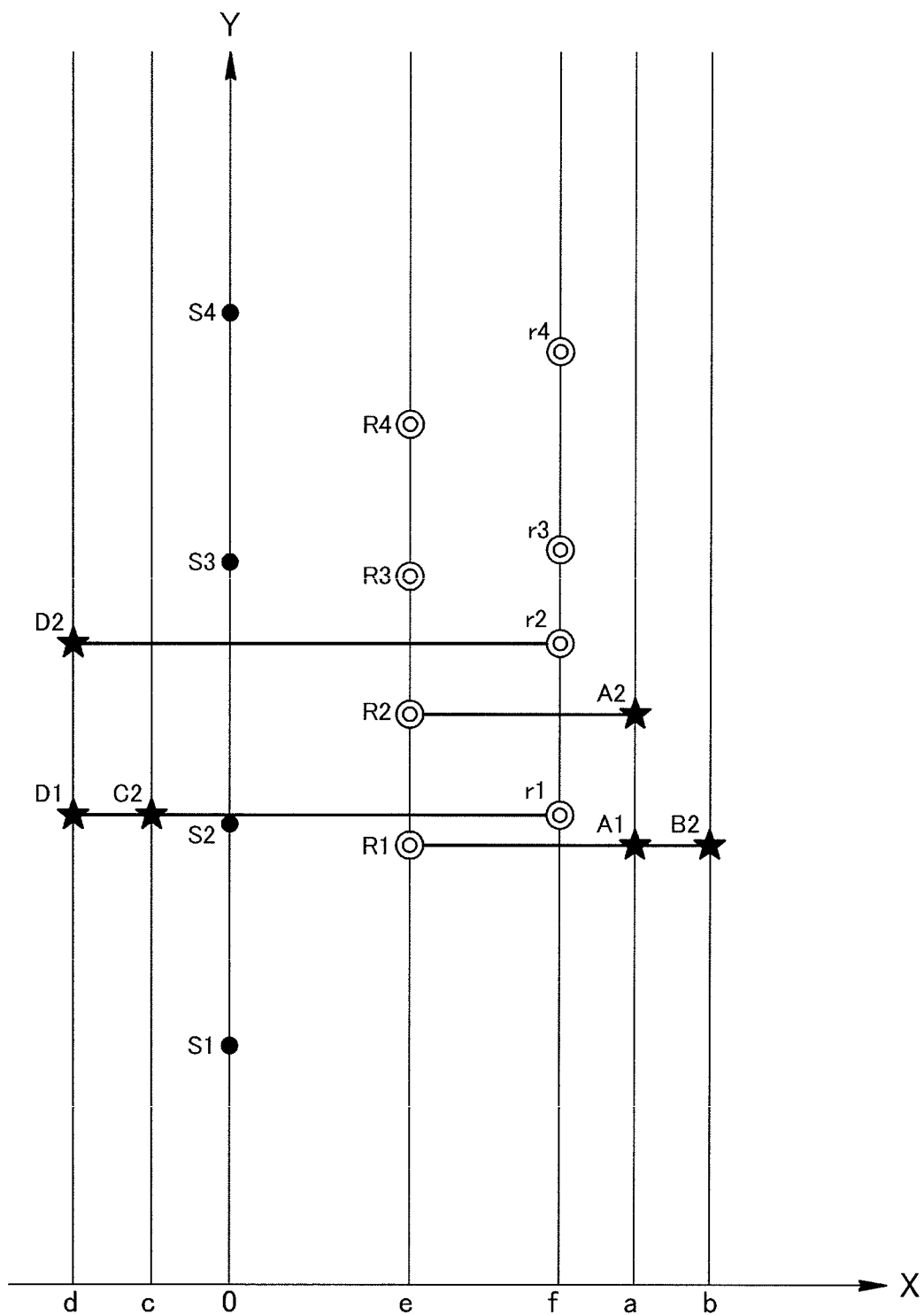
FIGS. 13 to 18 are diagrams showing the various steps of creating shared data parts in the secret sharing process of the second embodiment.

More specifically, when creating the shared data pieces Ai to Di (i≤2), A1=B2=R1, A2=R2, C2=D1=r1 and D2=r2 as shown in FIG. 13.

Figure 14:
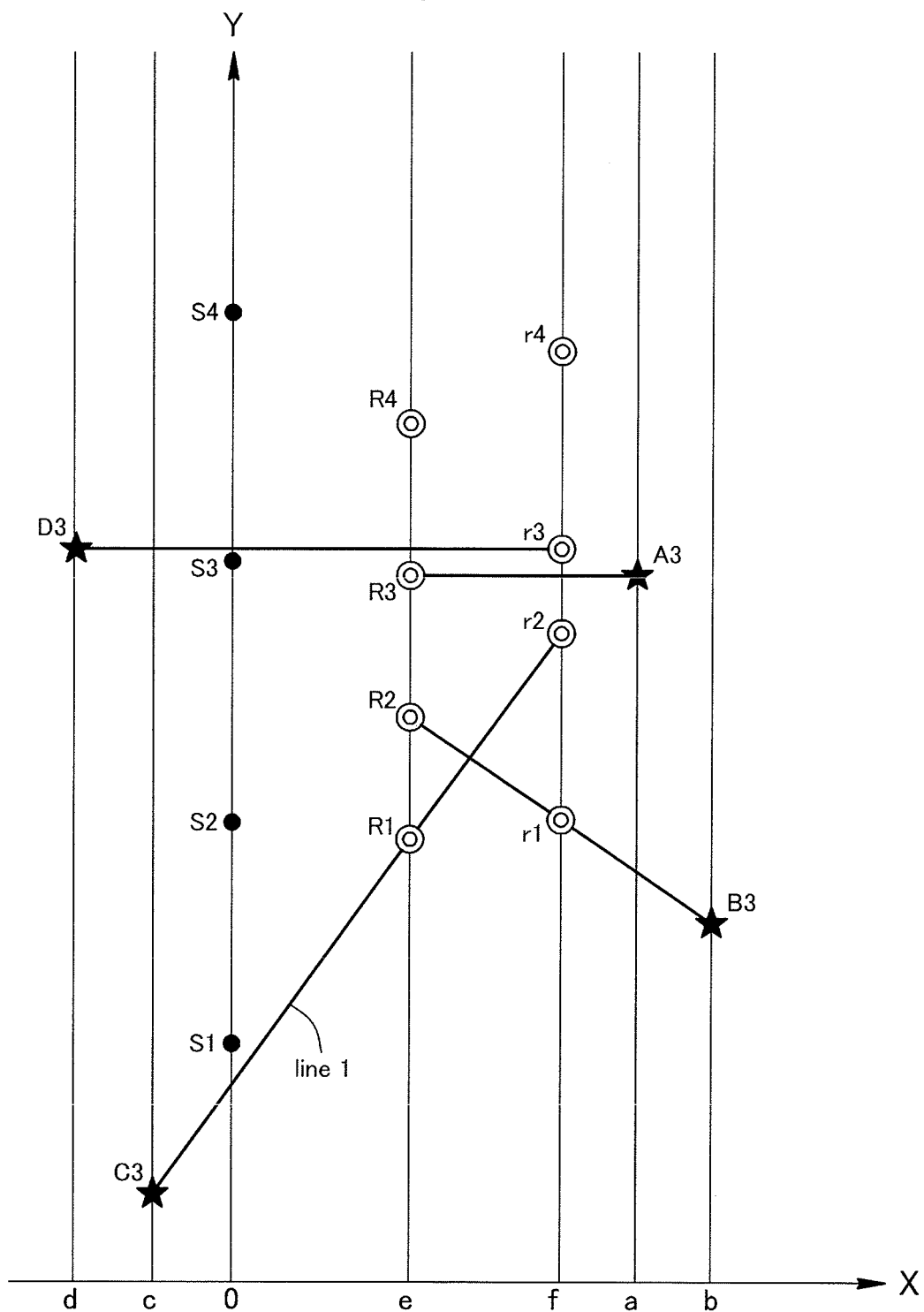

When creating the shared data pieces Ai to Di (i=3), as shown in FIG. 14, it is set such that A3=R3, D3=r3, the Y value of the line passing through the two random number data pieces R2 and r1 at X=b is the shared data piece B3, and the Y value of the line passing through the two random number data pieces R1 and r2 at X=c is the shared data piece C3.

Figure 15:
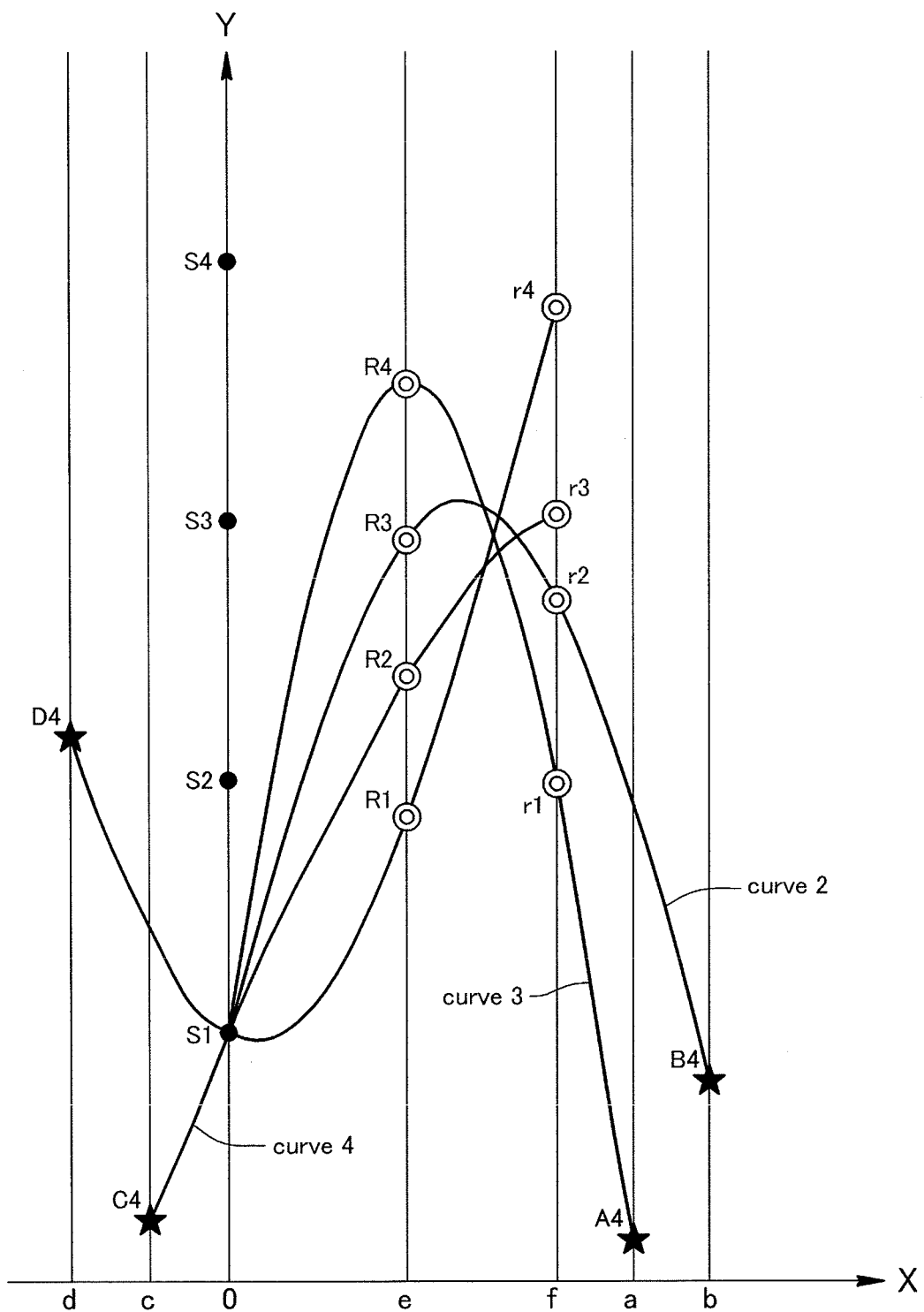

When creating the shared data pieces Ai to Di (i=4), as shown in FIG. 15, the Y value of the quadratic curve passing through the two random number data pieces R4 and r1 and the secret data piece S1 at X=a is set as the shared data piece A4, the Y value of the quadratic curve passing through the two random number data pieces R3 and r2 and the secret data piece S1 at X=b is set as the shared data piece B4, the Y value of the quadratic curve passing through the two random number data pieces R2 and r3 and the secret data piece S1 at X=c is set as the shared data piece C4, and the Y value of the quadratic curve passing through the two random number data pieces R1 and r4 and the secret data piece S1 at X=d is set as the shared data piece D4.

Figure 16:
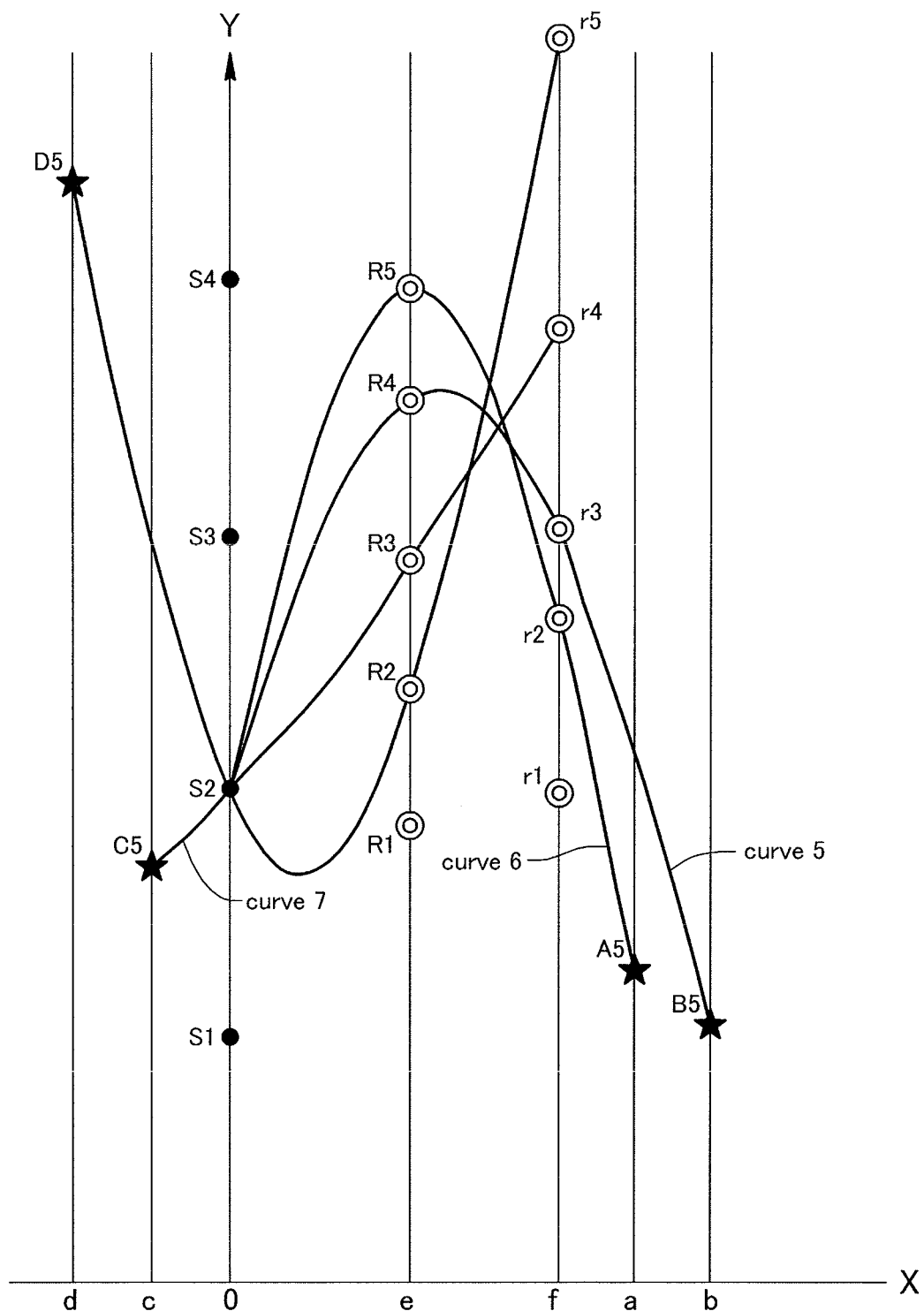

When creating the shared data pieces Ai to Di (i=5), as shown in FIG. 16, the Y value of the quadratic curve passing through the two random number data pieces R5 and r2 and the secret data piece S2 at X=a is set as the shared data piece A5, the Y value of the quadratic curve passing through the two random number data pieces R4 and r3 and the secret data piece S2 at X=b is set as the shared data piece B5, the Y value of the quadratic curve passing through the two random number data pieces R3 and r4 and the secret data piece S2 at X=c is set as the shared data piece C5, and the Y value of the quadratic curve passing through the two random number data pieces R2 and r5 and the secret data piece S2 at X=d is set as the shared data piece D5.

Figure 17:
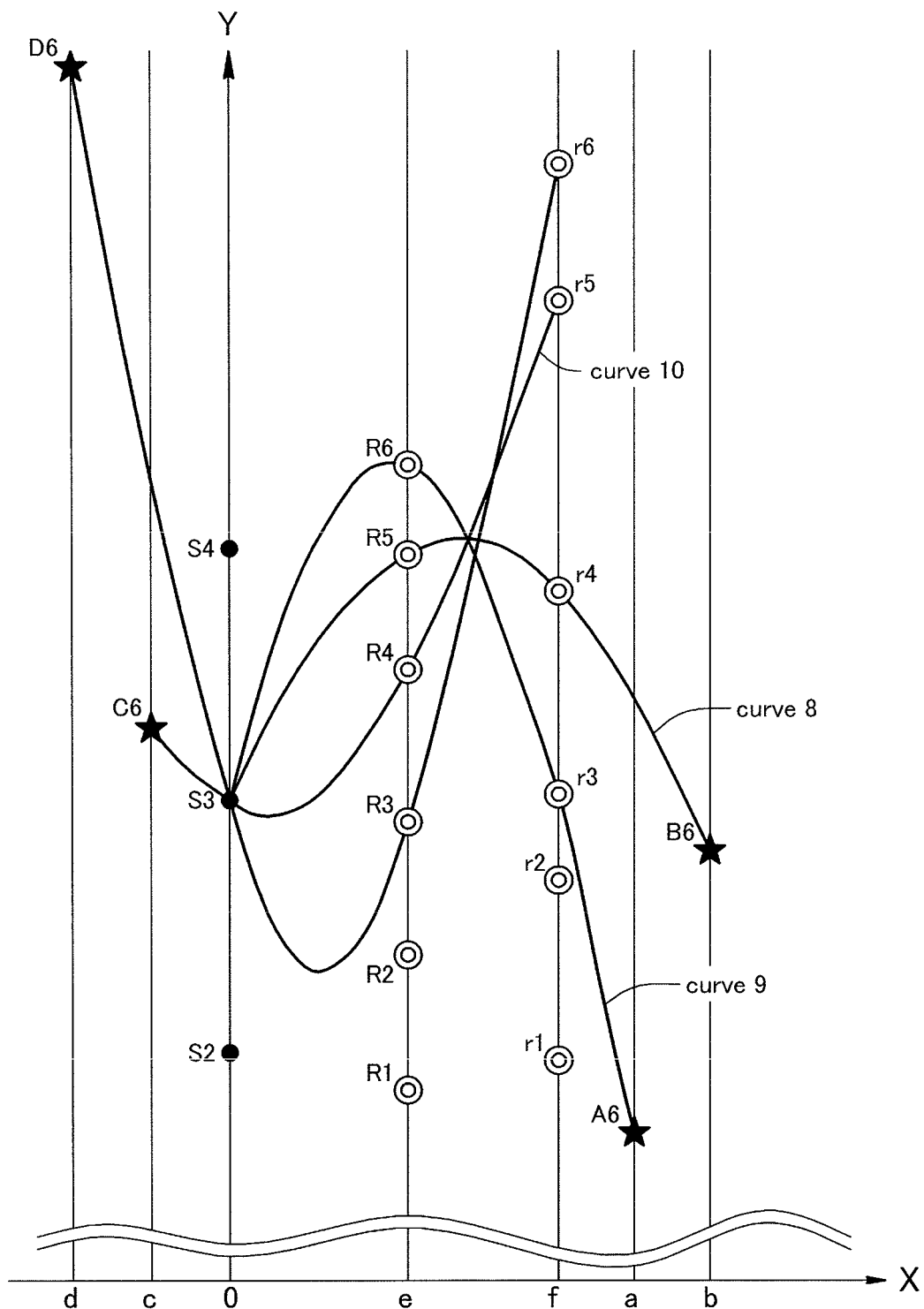

When creating shared data pieces Ai to Di (i=6), as shown in FIG. 17, the Y value of the quadratic curve passing through the two random number data pieces R6 and r3 and the secret data piece S3 at X=a is set as the shared data piece A6, the Y value of the quadratic curve passing through the two random number data pieces R5 and r4 and the secret data piece S3 at X=b is set as the shared data piece B6, the Y value of the quadratic curve passing through the two random number data pieces R4 and r5 and the secret data piece S3 at X=c is set as the shared data piece C6, and the Y value of the quadratic curve passing through the two random number data pieces R3 and r6 and the secret data piece S3 at X=d is set as the shared data piece D6 as shown in FIG. 17.

Figure 18:
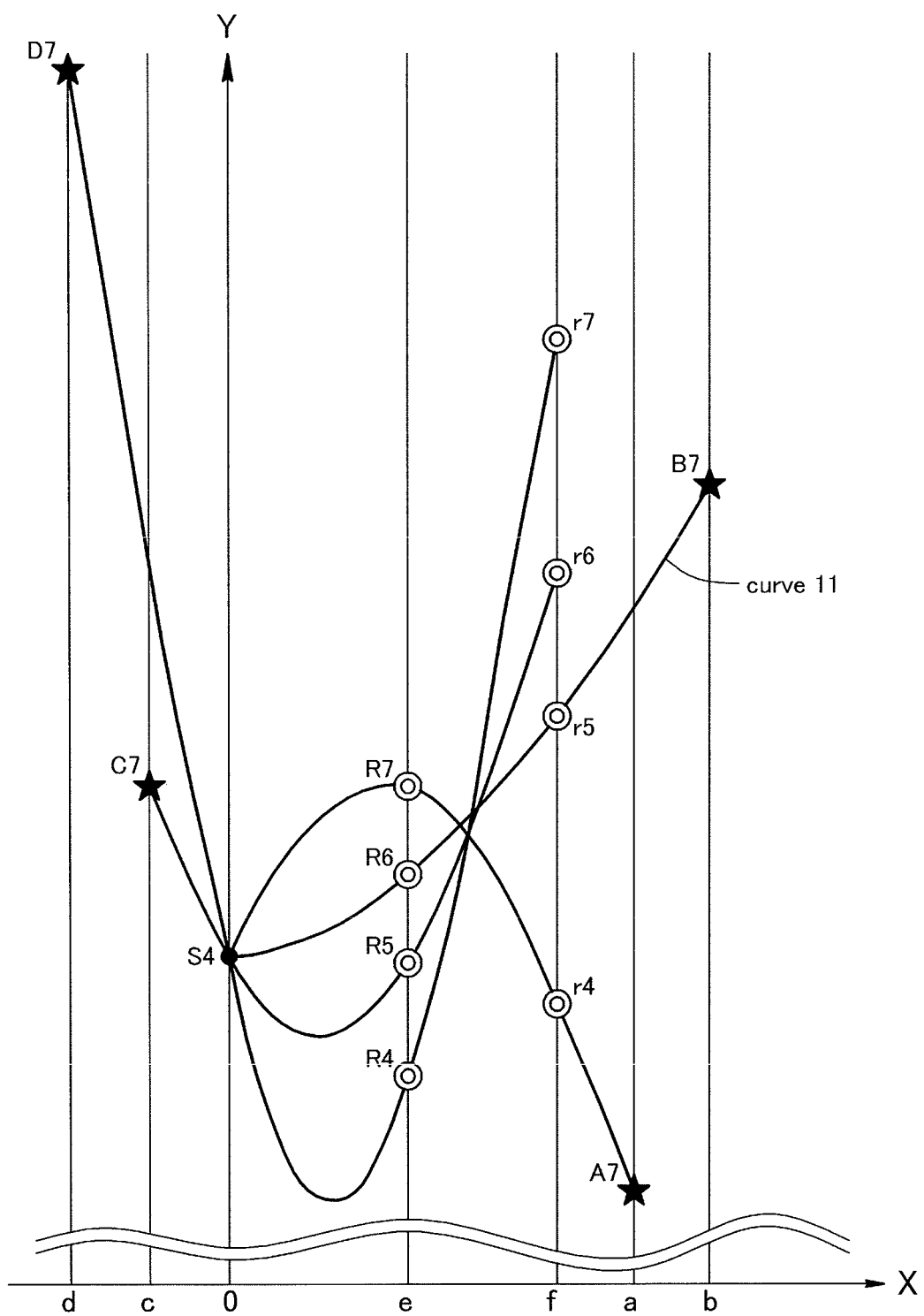

When creating shared data pieces Ai to Di (i=7), as shown in FIG. 18, the Y value of the quadratic curve passing through the two random number data pieces R7 and r4 and the secret data piece S4 at X=a is set as the shared data piece A7, the Y value of the quadratic curve passing through the two random number data pieces R6 and r5 and the secret data piece S4 at X=b is set as the shared data piece B7, the Y value of the quadratic curve passing through the two random number data pieces R5 and r6 and the secret data piece S4 at X=c is set as the shared data piece C7, and the Y value of the quadratic curve passing through the two random number data pieces R4 and r7 and the secret data piece S4 at X=d is set as the shared data piece D7.

In this embodiment also, the shared data pieces are created from data pieces for secret sharing computation belonging to different groups of data pieces. Also, the shared data pieces are created from different combinations of data pieces for secret sharing computation.

As opposed to the conventional threshold scheme where a plurality of shared data pieces are located on a same curve (see FIG. 28), in the present embodiment, the shared data pieces are located on different curves (quadratic curves), or, in other words, only one of the shared data pieces is located on each curve. As can be shown by the curves connecting "A, R and r", "B, R and r", "C, R and r" and "D, R and r", each curve contains only one shared data piece belonging to any shared data part A, B, C or D. This process creates four sets of shared data "A, R and r", "B, R and r", "C, R and r" and "D, R and r" with a threshold value k=3, and a number of participants n=3. From these four sets of data, the common random number data R (data for secret sharing computation) and the common random number data r (data for secret sharing computation) are dropped out so that a secret sharing with a threshold value k=3, and a number of participants n=4 is achieved.

Figure 19:
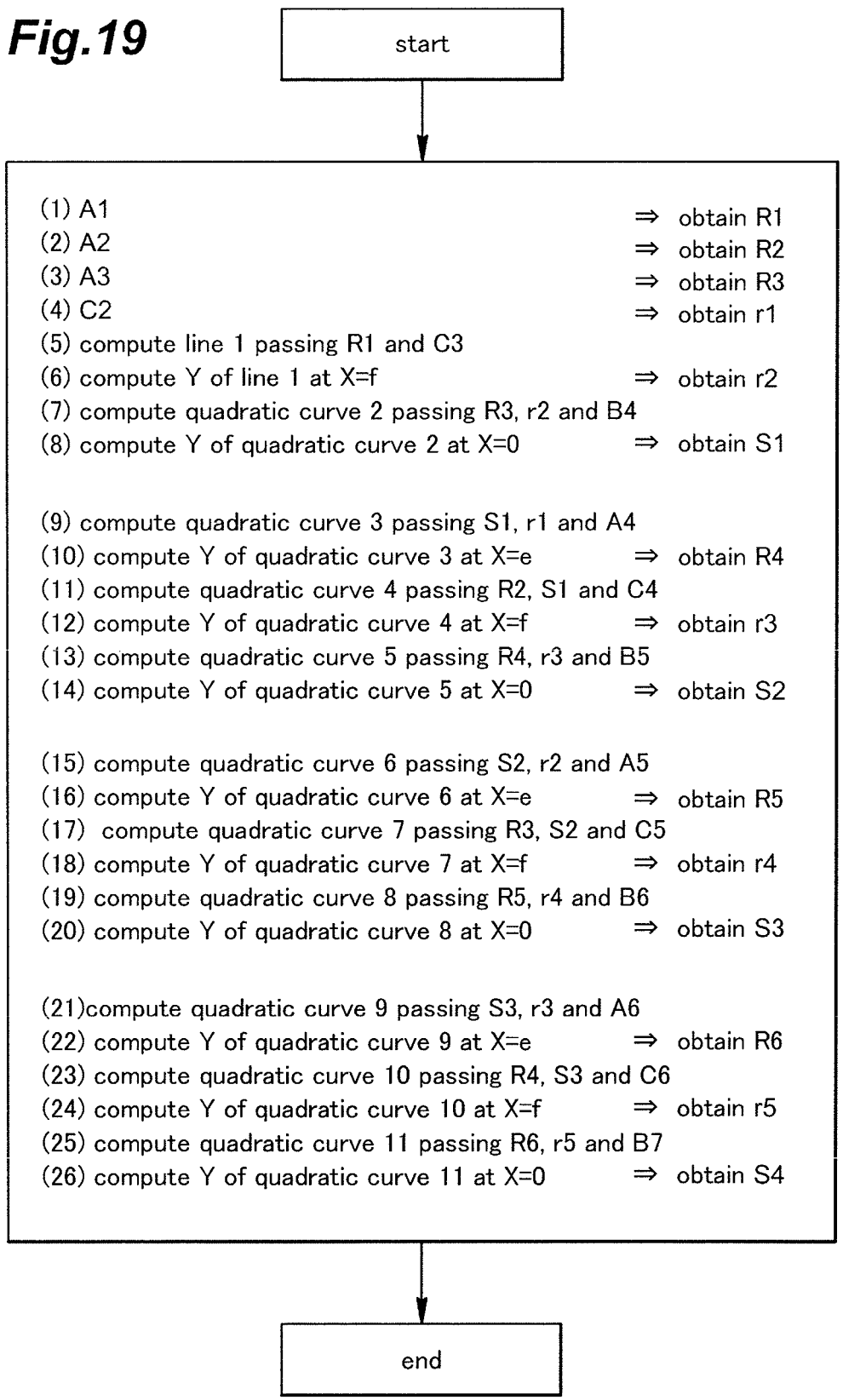
FIG. 19 is a flowchart showing the process of reconstructing the secret data from three of the shared data parts A, B and C in the second embodiment of the present invention.

FIG. 19 is a flowchart showing the process of reconstructing the secret data from three of the shared data parts A, B and C in the second embodiment of the present invention.

In the process of reconstructing the secret data from the shared data parts A, B and C, steps (1) to (26) shown in FIG. 19 are executed in a sequence. More specifically, the secret sharing/reconstruction unit 1 obtains the random number data pieces R1, R2, R3 and r1 by reversing the process of creating the shared data parts shown in FIGS. 13 and 14 in steps (1) to (4). The line 1 passing through the obtained random number data piece R1 and the shared data piece C3 is computed (see FIG. 14) in step (5), and the random number data piece r2 is obtained by computing the Y value of the line 1 at X=f in step (6). The quadratic curve 2 passing through the obtained random number data pieces R3 and r2 and the shared data piece B4 (see FIG. 15) is computed in step (7), and the secret data piece S1 is obtained by computing the Y value of the curve 2 at X=0 in step (8). The quadratic curve 3 passing through the secret data piece S1, the random number data piece r1 and the shared data piece A4 (see FIG. 15) is computed in step (9), and the random number data piece R4 is obtained by computing the Y value of the curve 3 at X=e in step (10).

The quadratic curve 4 passing through the secret data piece S1, the obtained random number data piece R2 and the shared data piece C4 (see FIG. 15) is computed in step (11), and the random number data piece r3 is obtained by computing the Y value of the curve 4 at X=f in step (12). The quadratic curve 5 passing through the obtained random number data pieces R4 and r3, and the shared data piece B5 (see FIG. 15) is computed in step (13), and the secret data piece S2 is obtained by computing the Y value of the curve 5 at X=0 in step (14). The quadratic curve 6 passing through the secret data piece S2, the obtained random number data piece r2 and the shared data piece A5 (see FIG. 16) is computed in step (15), and the random number data piece R5 is obtained by computing the Y value of the curve 6 at X=e in step (16). The quadratic curve 7 passing through the obtained random number data pieces R3, the secret data piece S2 and the shared data piece C5 (see FIG. 16) is computed in step (17), and the random number data piece r4 is obtained by computing the Y value of the curve 7 at X=f in step (18).

The quadratic curve 8 passing through the obtained random number data pieces R5 and r4, and the shared data piece B6 (see FIG. 17) is computed in step (19), and the secret data piece S3 is obtained by computing the Y value of the curve 8 at X=0 in step (20). The quadratic curve 9 passing through the secret data piece S3, the obtained random number data piece r3 and the shared data piece A6 (see FIG. 17) is computed in step (21), and the random number data piece R6 is obtained by computing the Y value of the curve 9 at X=e in step (22). The quadratic curve 10 passing through the obtained random number data piece R4, the secret data piece S3 and the shared data piece C6 (see FIG. 17) is computed in step (23), and the random number data piece r5 is obtained by computing the Y value of the curve 10 at X=f in step (24). Lastly, the quadratic curve 11 passing through the obtained random number data pieces R6 and r5 and the shared data piece B7 (see FIG. 18) is computed in step (25), and the random number data piece r5 is obtained by computing the Y value of the curve 11 at X=0 in step (26).

In this manner, the shared data parts A, B and C are created by forming the sets of shared data parts "A, R and r", "B, R and r" and "C, R and r" with a threshold value k=3, and a number of participants n=3, and the common random number data R (data for secret sharing computation) and the common random number data r (data for secret sharing computation) are dropped out. Therefore, when the shared data parts A, B and C are available, the information on the common random number data R (data for secret sharing computation) and the common random number data r (data for secret sharing computation) which were dropped out can be reconstructed, and this in turn allows the secret data to be reconstructed.

Also if a different sets of shared data parts (such as shared data parts A, B and D, and so on) are available, as long as a number of the shared data parts which is equal to or greater than the threshold value k in number are available, the reconstruction can be executed in a similar manner as the process based on the shared data parts A, B and C discussed above. It is also possible to use higher values for the threshold value k by using curves of higher orders and introducing (k−1) random number data parts similarly as in the first and second embodiments. Also, the number of participants n can be increased at will by suitably changing the combination of the secret data and the random number data parts (data for secret sharing computation).

In the first and second embodiments, the shared data parts were created from the secret data and the random number data by using the properties of curves of a prescribed order (or lines), but the present invention is not limited by such embodiments. For instance, in the secret sharing process executed by the secret sharing/reconstruction unit 1, the shared data can be created by using any suitable mathematical function (shared data creating mathematical function) using the secret data and the random number data as variables thereof. A process based on the use of certain shared data creating mathematical functions is described in the following.

Third Embodiment

FIG. 20 is a diagram listing the shared data creating mathematical functions that are used for the secret sharing process of a third embodiment of the present invention. In the third embodiment, the properties of the lines used in the secret sharing process (with threshold value k=2 and the number of participants n=3) by the secret sharing/reconstruction unit 1 of the first embodiment are generalized to the properties of the shared data creating mathematical functions, but otherwise the third embodiment is similar in principle to the first and second embodiments. In the description of the third embodiment, some of the parts corresponding to or similar to those of the first and second embodiments are omitted from the following description of the third embodiment.

As shown in (A), (B) and (C) of FIG. 20, the shared data pieces Ai to Ci (i=1, 2, 3, 4) forming the shared data parts A, B and C can be created by applying mathematical functions FunctionA (Rj, Sm), FunctionB (Rj, Sm), FunctionC (Rj, Sm) and FunctionB (Rj, Sm) to the secret data pieces Sm (m=1, 2, 3, 4) and the random number data pieces Rj (j=1, 2, 3, 4). Similarly as in the first and second embodiments, each shared data piece is generated from combination of a single secret data piece and a single random number data piece of each prescribed random number data part. Please note that some of the shared data pieces such as B1, C1 and C2 are each obtained by applying a mathematical function solely on random number data pieces R1 and R2.

In the case of the conventional threshold scheme (FIGS. 27 and 28) where a plurality of shared data pieces are located on a same line or a same curve, it was not possible to use other mathematical functions other than those that can be represented by lines or curves. For instance, if one tries to obtain S1 by operating XOR (exclusive logical sum) on "A1 and B1", there is no way that S1 can be obtained from "A1 and C1" or "B1 and C1". For this reason, the conventional threshold scheme does not allow the secret sharing process to be carried out by using mathematical functions other than linear functions and polynomial functions. As the conventional threshold scheme requires the use of linear functions represented by lines or polynomial functions represented by curves, the processes of secret sharing and secret data reconstruction required heavy computational loads and hence long processing times.

On the other hand according to the present invention, a secret sharing process based on the threshold scheme with a threshold value k and a number of participants n can be accomplished by preparing a set of data consisting of n shared data parts X and (k−1) random number data parts (data for secret sharing computation) or a set of data with a threshold value k and a number of participants n, and dropping out the information on the (k−1) random number data parts (data for secret sharing computation) from this data set to generate n shared data parts therefrom. Therefore, the secret sharing process of the present invention does not suffer from such problems, and can freely use mathematical functions in general which are suitable for rapid computation.

This advantage is gained from the fact that each shared data part can be computed independently from the other shared data parts. For instance, when computing S3 by taking XOR (exclusive logical sum) of "A3 and R3" in FIG. 2, XOR of "S3 and R3" may be obtained as A3. This does not affect the properties of "S2 and B3" and "S1 and C3" that pass through R3.

Any mathematical function can be used for the shared data creating mathematical functions FunctionA to FunctionC, but those suitable for rapid computation such as XOR (exclusive logical sum) or mathematical functions based on multiplication/division in a residual field (for instance, the shared data may be created by multiplication in a residual field, and the secret data may be reconstructed by division in the residual field) are preferred.

As the shared data pieces Ai to Ci (i=1, 2, 3, 4) can be selected as values that do not affect one another as opposed to the conventional threshold scheme illustrated in FIG. 27, the shared data creating mathematical functions FunctionA to FunctionC can be different from one another. In this case, even when a third party has acquired a number of shared data parts equal to or greater than the threshold value in number, if the information on the shared data creating mathematical functions is hidden, an easy reconstruction of the secret data can be avoided with the shared data creating mathematical functions functioning as a part of encryption. In particular, if a number of mutually different shared data creating mathematical functions are used, the security of the secret data can be even more enhanced.

In this case, three shared data creating mathematical functions FunctionA to FunctionC of a same kind are used, but it is also possible to use different kinds of mathematical functions for creating different shared data parts so that the level of complexity and hence the level of security may be enhanced.

Figure 21:
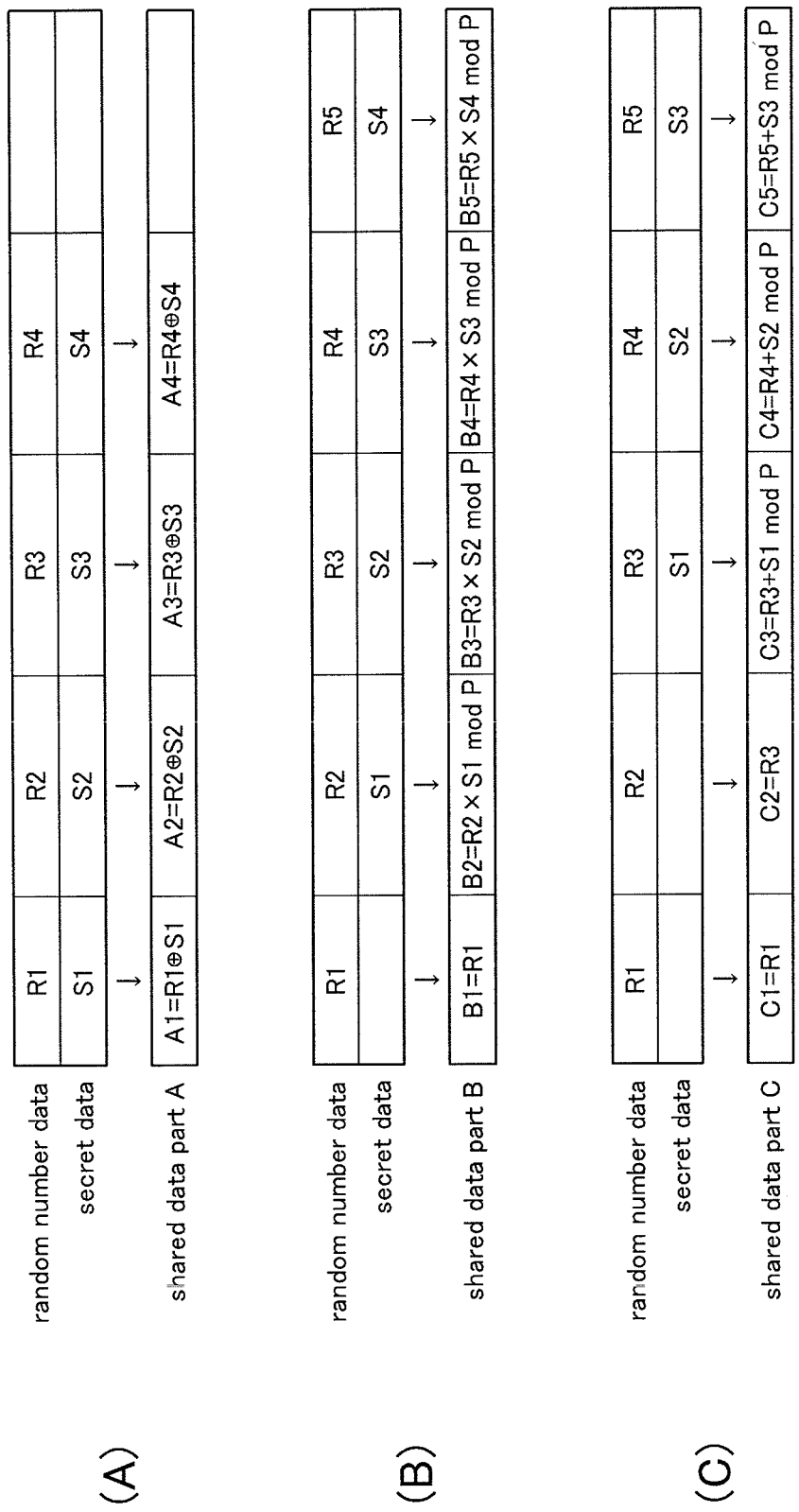
FIG. 21 is a diagram illustrating the process of creating shared data pieces of each shared data part according to the secret sharing method of the third embodiment, (A), (B) and (C) showing how shared data part A, shared data part B and shared data part C are created, respectively.

FIG. 21 is a diagram showing the method of creating shared data in the secret sharing process of the third embodiment. FIG. 21, which is similar to FIG. 3 for the first embodiment, illustrates the process of creating shared data parts A, B and C.

In the creation of shared data parts A, B and C in the third embodiment, as shown in (A), (B) and (C) of FIG. 21, except for some of the random data pieces B1, C1 and C2 which are directly borrowed from the random number data pieces R1, R1 and R2, respectively, prescribed shared data creating mathematical functions FunctionA to FunctionC of a single secret data piece and a single random number data piece are used.

For the shared data part A shown in (A) of FIG. 21, XOR (exclusive logical sum) is used as FunctionA for creating shared data pieces A1 to A4 (the symbol "⊕" in (A) of FIG. 21 denoting XOR). For the shared data part B shown in (B) of FIG. 21, multiplication in a Galois field is used as FunctionB for creating shared data pieces B2 to B5. For instance, the shared data piece B2 is created as a residue obtained by dividing the product of the random number data piece R2 and the secret data piece S1 with a prime number P. For the shared data part C shown in (C) of FIG. 21, addition in a Galois field is used as FunctionC for creating shared data pieces C3 to C5. For instance, the shared data piece C3 is created as a residue obtained by dividing the sum of the random number data piece R3 and the secret data piece S1 with a prime number P.

In this embodiment also, the shared data pieces are created from data pieces for secret sharing computation belonging to different groups of data pieces. Also, the shared data pieces are created from different combinations of data pieces for secret sharing computation.

In this example, each shared data part is created by a different shared data creating mathematical function, but it is also possible to create each shared data piece belonging to a same shared data part by using a different shared data creating mathematical function.

Figure 22:
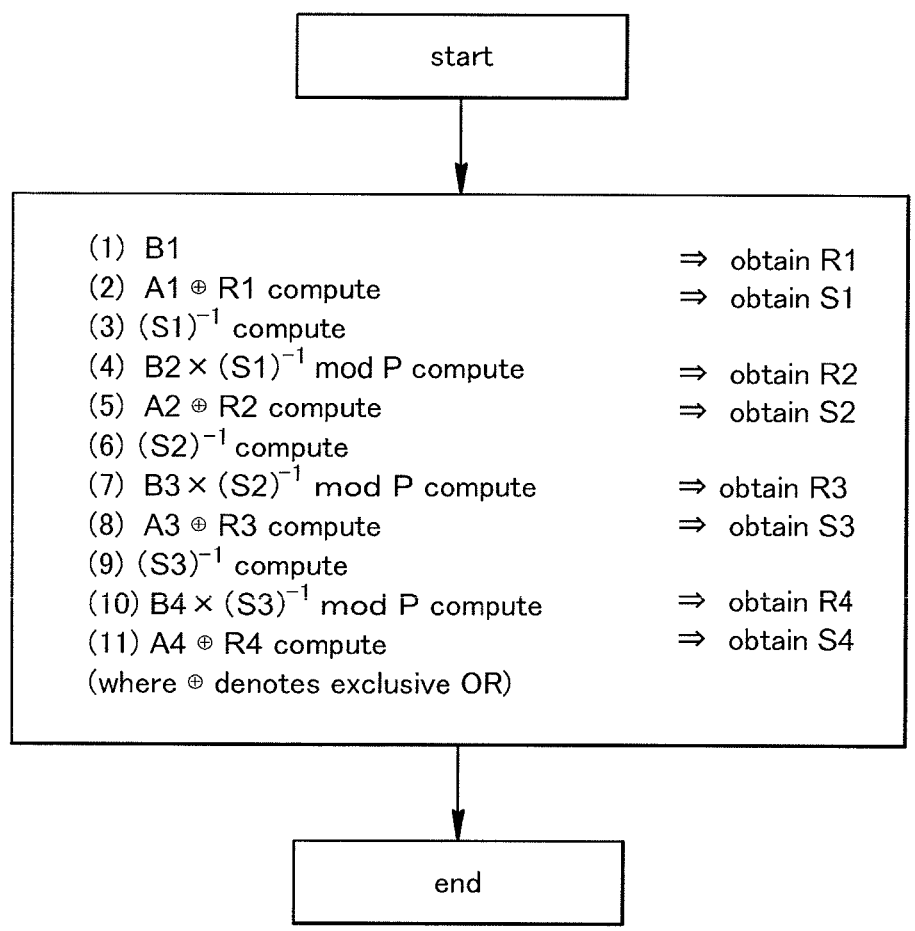
FIG. 22 is a flowchart showing the process of reconstructing the secret data from two of the shared data parts A and B in the third embodiment.

FIG. 22 is a flowchart showing the process of reconstructing the secret data from two of the shared data parts A and B in the secret sharing/reconstruction unit 1 of the third embodiment.

In the process of reconstructing the secret data from two of the shared data parts A and B, steps (1) to (11) shown in FIG. 22 are executed in sequence. The shared data part A is put through a reconstruction process by using XOR (exclusive logical sum) similarly as in the creation process thereof. The shared data part B is put through a reconstruction process by using division in a Galois field. As this division is equivalent to multiplication of the inverse element, the inverse element of the original data piece (for instance, the inverse element of the secret data piece S1 is indicated by $S1^{-1}$ in FIG. 22) is computed, and used for the multiplication in the Galois field. The reverse element can be obtained by using the Euclidean algorithm.

More specifically, as shown in FIG. 22, the secret sharing/reconstruction unit 1 obtains the random number data piece R1 directly from the shared data piece B1 of the shared data part B in step (1). The secret data piece S1 is obtained by the XOR of the random number data piece R1 and the shared data piece A1 in step (2). The inverse element $S1^{-1}$ of the secret data piece S1 is obtained in step (3), and the random number data piece R2 is obtained by computing $B2 \times S1^{-1}$ mod P in step (4). The secret data piece S2 is obtained by the XOR of the random number data piece R2 and the shared data piece A2 in step (5). The inverse element $S2^{-1}$ of the secret data piece S2 is obtained in step (6), and the random number data piece R3 is obtained by computing $B3 \times S2^{-1}$ mod P in step (7). The secret data piece S3 is obtained by the XOR of the random number data piece R3 and the shared data piece A3 in step (8). The inverse element $S3^{-1}$ of the secret data piece S3 is obtained in step (9), and the random number data piece R4 is obtained by computing $B4 \times S3^{-1}$ mod P in step (10). Finally, the secret data piece S4 is obtained by the XOR of the random number data piece R4 and the shared data piece A4 in step (11).

Figure 23:
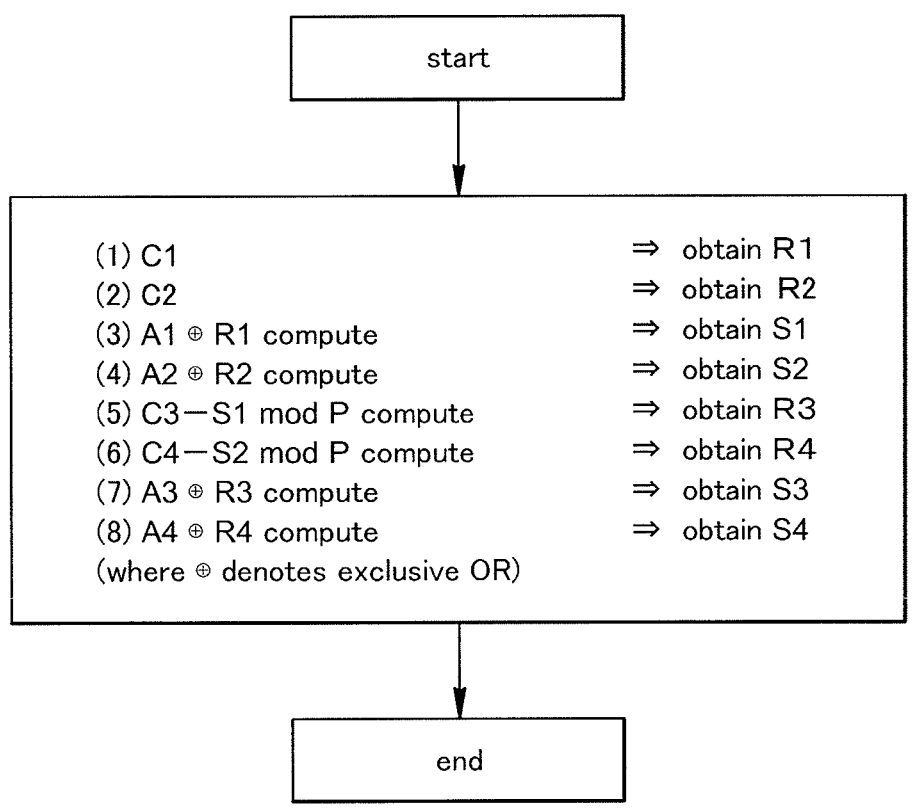
FIG. 23 is a flowchart showing the process of reconstructing the secret data from two of the shared data parts A and C in the third embodiment.

FIG. 23 is a flowchart showing the process of reconstructing the secret data from two of the shared data parts A and C in the secret sharing/reconstruction unit 1 of the third embodiment.

In the process of reconstructing the secret data from two of the shared data parts A and C, steps (1) to (8) shown in FIG. 23 are executed in sequence. The shared data part A and the associated random number data part R are put through a reconstruction process by using XOR (exclusive logical sum) similarly as in the creation process thereof. The shared data part C and the associated random number data part R are put through a reconstruction process by using subtraction in a Galois field. If the result of the subtraction is negative, a prime number is added thereto to make it positive.

More specifically, as shown in FIG. 23, the secret sharing/reconstruction unit 1 obtains the random number data pieces R1 and R2 directly from the shared data pieces C1 and C2 of the shared data part C in steps (1) and (2). The secret data piece S1 is obtained by the XOR of the random number data piece R1 and the shared data piece A1 in step (3). The secret data piece S2 is obtained by the XOR of the random number data piece R2 and the shared data piece A2 in step (4). The random number data piece R3 is obtained by computing C3-S1 mod P in step (5). The random number data piece R4 is obtained by computing C4-S2 mod P in step (6). The secret data piece S3 is obtained by the XOR of the random number data piece R3 and the shared data piece A3 in step (7). Finally, the secret data piece S4 is obtained by the XOR of the random number data piece R4 and the shared data piece A4 in step (8).

Figure 24:
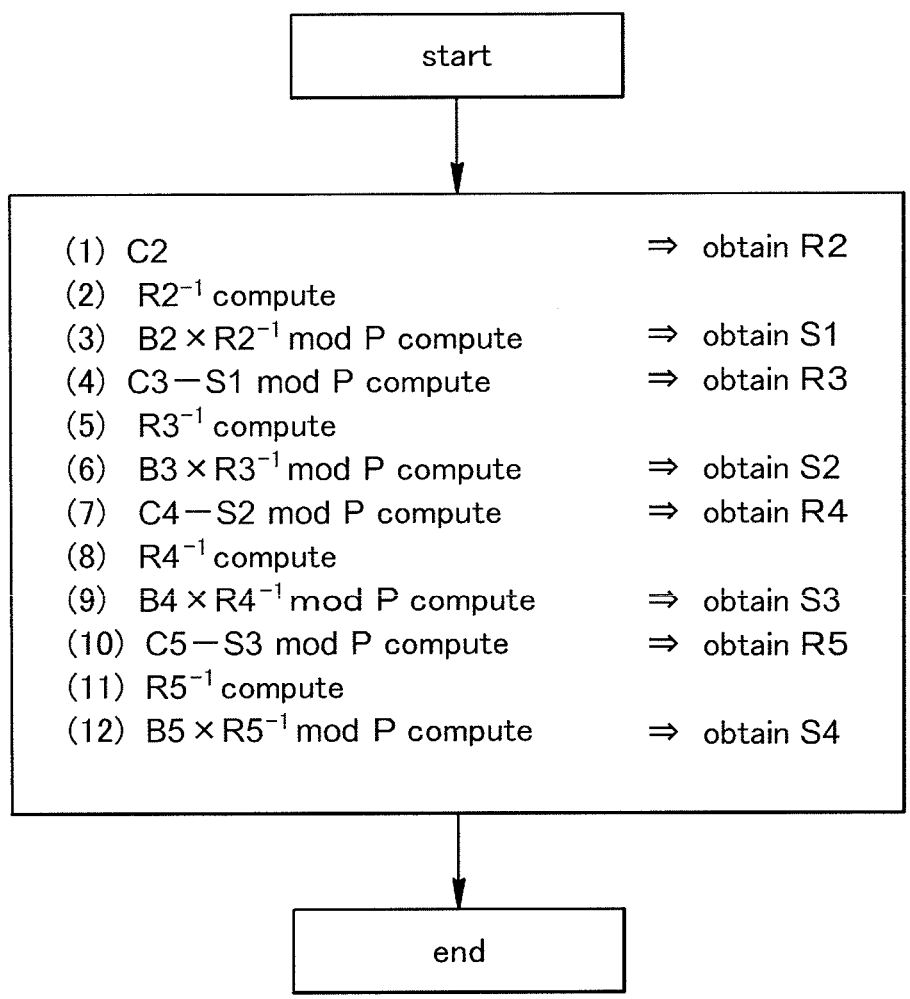
FIG. 24 is a flowchart showing the process of reconstructing the secret data from two of the shared data parts B and C in the third embodiment.

FIG. 24 is a flowchart showing the process of reconstructing the secret data from two of the shared data parts B and C in the secret sharing/reconstruction unit 1 of the third embodiment.

In the process of reconstructing the secret data from two of the shared data parts B and C, steps (1) to (12) shown in FIG. 24 are executed in sequence. More specifically, as shown in FIG. 24, the secret sharing/reconstruction unit 1 obtains the random number data piece R2 directly from the shared data piece C2 of the shared data part C in step (1). The inverse element $R2^{-1}$ of the obtained shared data piece R2 is obtained from the shared data piece C2 of the shared data part C in step (2), and the secret data piece S1 is obtained by computing $B2 \times R2^{-1}$ mod P in step (3). The random number data piece R3 is obtained by computing C3-S1 mod P in step (4). The inverse element $R3^{-1}$ of the obtained shared data piece R3 is obtained in step (5), and the secret data piece S2 is obtained by computing $B3 \times R3^{-1}$ mod P in step (6). The random number data piece R4 is obtained by computing C4-S2 mod P in step (7). The inverse element $R4^{-1}$ of the obtained shared data piece R4 is obtained in step (8), and the secret data piece S3 is obtained by computing $B4 \times R4^{-1}$ mod P in step (9). The random number data piece R5 is obtained by computing C5-S3 mod P in step (10). The inverse element $R5^{-1}$ of the obtained shared data piece R5 is obtained in step (11), and, finally, the secret data piece S4 is obtained by computing $B5 \times R5^{-1}$ mod P in step (12).

Figure 26:
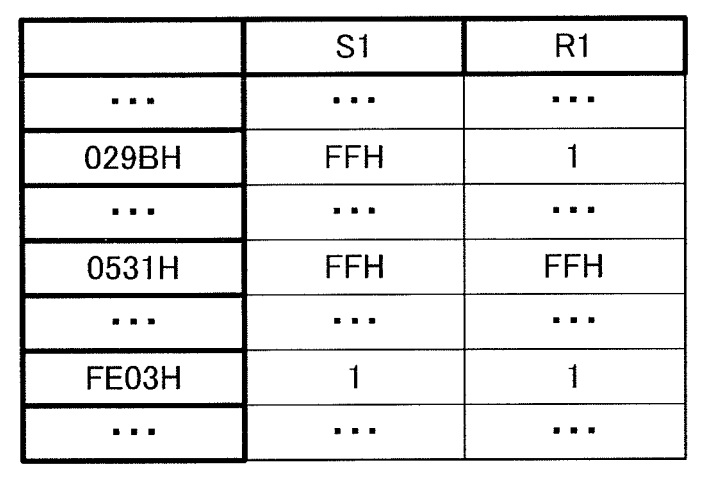

FIGS. 25 and 26 are diagrams illustrating the process of creating shared data and the process reconstructing the secret data given as a modification of the third embodiment. The shared data creating mathematical functions are not limited to regular mathematical functions discussed above, but may also consist of reference tables such as those shown in the following.

FIG. 25 shows an example of the reference table for creating shared data (with a threshold value k=2 and a number of participants n=3). In this reference table, each output value can be obtained by designating a particular row (1 to FFH) and a particular column (1 to FFH) of the reference table. Here, H denotes a hexadecimal number. For instance, when the secret data piece S1 is 1 and the random number data piece R1 is 1, the shared data piece A1 can be given as the output value of FE03H.

FIG. 26 shows an example of the reference table for reconstructing secret data. In this reference table, by designating each particular row, two output values (the values of S1 and R1 in this example) can be obtained. For instance, as opposed to the example of FIG. 25, by entering the value of the shared data piece A1 such as FE03H, the output values of the secret data piece S1 and the random dumber data piece R1 can be obtained as 1 and 1, respectively. It is also possible to reverse the input values and the output values in FIG. 25 so that the table may be used as a reference table for secret data reconstruction.

As can be appreciated from the foregoing description of this modified embodiment, by using reference tables as the shared data creating mathematical functions for secret sharing process and secret data reconstructing process, the processes can be significantly simplified in terms of computational load and freedom in the selection of the mathematical functions (reference tables).

In this example, the random number data was used in creating the shared data, but it is also possible to create the shared data solely from the secret data.

As discussed above, in the secret sharing/reconstruction unit 1 according to the present invention, shared data pieces are obtained by applying shared data creating mathematical functions to variables such as secret data pieces and random number data pieces. Therefore, any mathematical functions or algorithms selected by the user can be incorporated in the secret sharing process. Therefore, mathematical functions suitable for each application in terms of the level of security and the required computational load can be selected. And, because the selected mathematical functions may not be fixed, and are therefore difficult for a third party to know, even when shared data parts equal to a greater than the threshold value in number may be made available to the third party, the third party may still be prevented from easily reconstructing the secret data.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application as well as the contents of the prior art references mentioned in this application are incorporated in this application by reference.

GLOSSARY 1 secret sharing processing unit
2 sharer unit
3 client unit
12 secret sharing process receiving unit
13 secret sharing processing unit (shared data creating unit)
14 ID generating unit
15 random number generating unit
16 shared data storage unit (secret data storage unit)
21 reconstruction process receiving unit
22 reconstruction process receiving unit
23 reconstructing data storage unit

The invention claimed is:

1. A secret sharing method in which secret data is shared as shared data parts equal to or greater than a threshold value in number such that the secret data cannot be reconstructed from shared data parts less than the threshold value in number, comprising:
deriving secret data pieces from secret data stored in a storage;
generating a plurality of groups being equal to or greater than the threshold value in number, one of the groups having at least parts of unpublished data pieces, and another one of the groups having at least parts of secret data pieces derived from the secret data stored in a storage;
creating, by a processor, a plurality of shared data parts, each of which having shared data pieces, at least parts of the shared data pieces are created by combining at least parts of the unpublished data pieces and at least parts of the secret data pieces; and combining the created shared data pieces into a plurality of shared data parts, including first shared data parts and second shared data parts, equal to or greater than the threshold value in number;

wherein at least parts of the shared data pieces combined into the first shared data parts are created based on combinations of at least parts of the unpublished data pieces and at least parts of the secret data pieces, and at least parts of the shared data pieces combined into the second shared data parts are created based on other combinations of at least parts of the unpublished data pieces and at least parts of the secret data pieces, which are different from the combinations of at least parts of the unpublished data pieces and at least parts of the secret data pieces that were used to create the first shared data parts.

2. The secret sharing method according to claim 1, wherein the unpublished data pieces comprise a random number data piece.

3. The secret sharing method according to claim 2, wherein at least one of the groups of the unpublished data pieces entirely consists of random number data pieces.

4. The secret sharing method according to claim 2, wherein at least one of the shared data pieces consists of a random number data piece.

5. The secret sharing method according to claim 1, wherein the unpublished data pieces comprise a secret data piece obtained by processing the secret data.

6. The secret sharing method according to claim 1, wherein the shared data pieces include those created by using a reference table designating a correspondence between the unpublished data pieces and the shared data pieces.

7. The secret sharing method according to claim 1, wherein the shared data pieces include those created by operating XOR on the unpublished data pieces.

8. The secret sharing method according to claim 1, wherein the shared data pieces include those created by operating a shared data creating mathematical function on the unpublished data pieces.

9. The secret sharing method according to claim 1, wherein each shared data piece is created from a different combination of one of the unpublished data pieces and one of the secret data pieces.

10. The secret sharing method according to claim 1, wherein the unpublished data pieces comprise random number data pieces, parts of the secret data pieces, or data pieces input from a user.

11. A secret sharing system including a secret sharing processor for splitting secret data into a plurality of shared data parts equal to a greater than a threshold value in number, a communication controller for transmitting the shared data parts and a reconstruction processor for reconstructing the secret data from the shared data parts equal to or greater than the threshold value in number received from the communication controller, wherein:

the secret sharing processor is configured to derive secret data pieces from secret data stored in a storage;

the secret sharing processor is also configured to create a plurality of shared data parts, each of which having shared data pieces, at least parts of the shared data pieces are created by combining into different combinations of at least parts of unpublished data pieces and at least parts of secret data pieces generated from the secret data; and the reconstruction processor is configured to reconstruct the secret data from the received shared data parts upon receiving the shared data parts equal to greater than the threshold value in number;

each of the shared data pieces being created from an essentially different combination of the unpublished data pieces and the secret data pieces.

12. The secret sharing system according to claim 11, wherein the unpublished data pieces comprise a random number data piece.

13. The secret sharing system according to claim 12, wherein the unpublished data pieces entirely consist of random number data pieces.

14. The secret sharing system according to claim 12, wherein at least one of the shared data parts consists of a random number data part.

15. The secret sharing system according to claim 11, wherein the secret data pieces comprise a secret data piece obtaining by processing the secret data.

16. The secret sharing system according to claim 11, wherein the shared data pieces include those created by using a reference table designating a correspondence between the unpublished data pieces and the shared data pieces.

17. The secret sharing system according to claim 11, wherein the shared data pieces include those created by operating XOR on one of the unpublished data pieces and one of the secret data pieces.

18. The secret sharing system according to claim 11, wherein the shared data pieces include those created by operating a shared data creating mathematical function on one of the unpublished data pieces and one of the secret data pieces.

19. The secret sharing system according to claim 11, wherein each shared data piece is created from a different combination of one of the unpublished data pieces and one of the secret data pieces.

20. The secret sharing system according to claim 11, wherein the unpublished data pieces comprise random number data pieces, parts of the secret data pieces, or data pieces input from a user.

* * * * *